(12) United States Patent
Yoshioka et al.

(10) Patent No.: US 9,159,977 B2
(45) Date of Patent: Oct. 13, 2015

(54) METHOD FOR PRODUCING ELECTRIC STORAGE DEVICE, SPACER AND ELECTRIC STORAGE DEVICE

(71) Applicant: LITHIUM ENERGY JAPAN, Kyoto-shi (JP)

(72) Inventors: Toshiki Yoshioka, Ritto (JP); Toshiki Kusunoki, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 47 days.

(21) Appl. No.: 13/897,147

(22) Filed: May 17, 2013

(65) Prior Publication Data
US 2013/0309539 A1 Nov. 21, 2013

(30) Foreign Application Priority Data

May 21, 2012 (JP) .................................. 2012-115704
Apr. 8, 2013 (JP) .................................. 2013-080730

(51) Int. Cl.
*H01M 2/14* (2006.01)
*H01G 11/52* (2013.01)
*H01G 11/10* (2013.01)
*H01G 11/76* (2013.01)
*H01G 11/78* (2013.01)
*H01M 2/20* (2006.01)

(52) U.S. Cl.
CPC .................. *H01M 2/14* (2013.01); *H01G 11/10* (2013.01); *H01G 11/52* (2013.01); *H01G 11/76* (2013.01); *H01G 11/78* (2013.01); *H01M 2/145* (2013.01); *H01M 2/206* (2013.01); *Y02E 60/13* (2013.01); *Y02T 10/7022* (2013.01); *Y10T 29/417* (2015.01); *Y10T 29/49108* (2015.01)

(58) Field of Classification Search
CPC .............................. H01M 2/14; H01M 2/145
USPC ...................................................... 429/99, 100
See application file for complete search history.

(56) References Cited

U.S. PATENT DOCUMENTS

| | | | | |
|---|---|---|---|---|
| 2007/0141457 A1* | 6/2007 | Amagai | .................... | 429/152 |
| 2010/0227212 A1* | 9/2010 | Kim | .................... | 429/158 |
| 2011/0052970 A1 | 3/2011 | Kurata et al. | | |
| 2011/0159353 A1* | 6/2011 | Byun et al. | .................... | 429/160 |
| 2013/0000957 A1 | 1/2013 | Ikeda et al. | | |

FOREIGN PATENT DOCUMENTS

| | | |
|---|---|---|
| JP | 2008-123769 A | 5/2008 |
| JP | 2010-097722 A | 4/2010 |
| JP | 2011-071104 A | 4/2011 |
| JP | 2011-228217 A | 11/2011 |

OTHER PUBLICATIONS

Machine translation of JP 2008-123769, obtained Sep. 23, 2014.*

* cited by examiner

*Primary Examiner* — Nicholas P D'Aniello
(74) *Attorney, Agent, or Firm* — McGinn IP Law Group, PLLC.

(57) ABSTRACT

A method for producing an electric storage device having a bus bar and an electric storage element equipped with an external terminal includes the steps of: arranging the electric storage element having the external terminal, positioning a resin member having either one of a receiving portion or a projection relative to the electric storage element, arranging the bus bar having the other one of the receiving portion or the projection on the external terminal, connecting the bus bar to the external terminal, and inserting the projection into the receiving portion in the step of arranging the bus bar.

16 Claims, 15 Drawing Sheets

F I G . 4
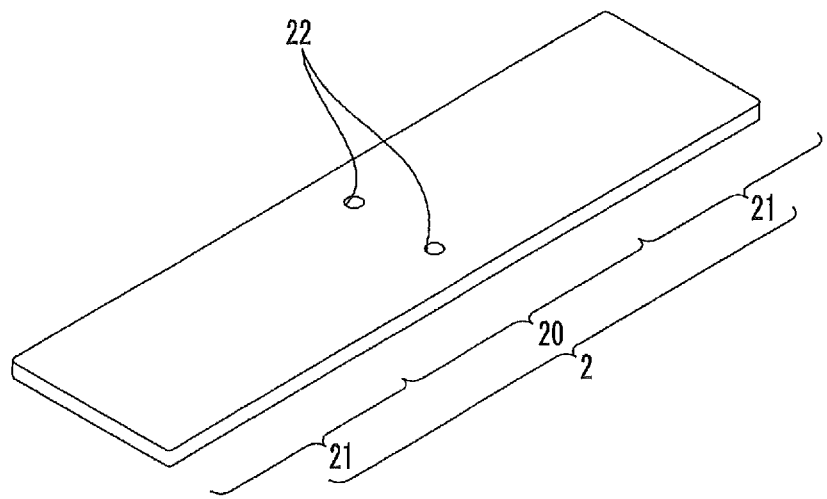

F I G . 7
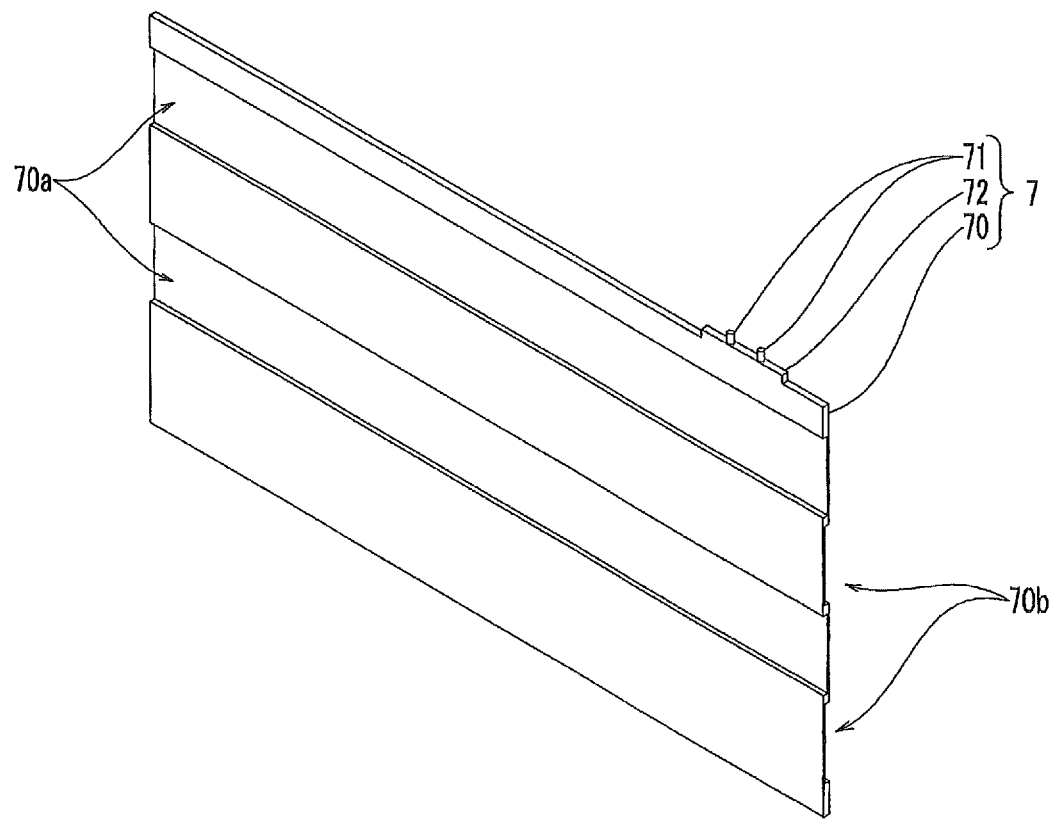

METHOD FOR PRODUCING ELECTRIC STORAGE DEVICE, SPACER AND ELECTRIC STORAGE DEVICE

CROSS-REFERENCE TO RELATED APPLICATION

This application claims priority to Japanese Patent Application Nos. 2012-115704 and 2013-080730, the disclosure of which is incorporated herein by reference in its entirety.

FIELD

The present invention relates to a method for producing an electric storage device provided with: an electric storage element having an external terminal; and a bus bar connected to the external terminal. The present invention also relates to a spacer arranged between two electric storage elements that are electrically connected together via a bus bar, and to an electric storage device provided with this spacer.

BACKGROUND

High-capacity electric storage devices are employed as a power source for various equipment such as hybrid electric vehicles (HEV), electric vehicles (EV), electric motorcycles, aircrafts, and ships. Such an electric storage device is provided with a rechargeable electric storage element, such as batteries (lithium ion batteries, nickel hydrogen batteries, or the like) and capacitors (electrical double-layer capacitors, or the like), and a bus bar that is electrically connected to the electric storage element.

The electric storage element is provided with an electrode assembly that includes a positive electrode plate and a negative electrode plate, a case that houses the electrode assembly, and an external terminal that is electrically connected to the electrode assembly and arranged outside the case. The number of the electric storage element to be provided is at least one. That is, the number of the electric storage element to be provided in an electric storage device corresponds to the output (capacity) of the electric storage device.

The bus bar serves to connect electric storage elements electrically to each other, or to connect each electric storage element electrically to an external load. Therefore, the bus bar is composed of a metal material having electrical conductivity, and has a connection region that is connected to the external terminal of the electric storage element. The bus bar (connection region) is connected to the external terminal of the electric storage element by screwing or welding. This allows the bus bar to be connected to the external terminal not only electrically but also mechanically. In the electric storage device of this type, the charge or discharge state, the service life, or the like, of the electric storage element is monitored by a monitoring device mounted on the electric storage device or a monitoring device configured as a separate body from the electric storage device. Following this, a wiring member that transmits information (signals of voltage, temperature, etc.) on the electric storage element between the electric storage element and the monitoring device is connected to the bus bar. That is, the bus bar is provided with a receiving portion to which a screw member for connecting the wiring member or a conductor such as a rivet is secured.

When the bus bar is connected to the external terminal of the electric storage element, the bus bar is required to be positioned relative to the external terminal of the electric storage element so that the relative arrangement between the bus bar and the external terminal should be appropriate. Following this, there is proposed a method in which an electric storage element is provided with a projection, and a bus bar is provided with a receiving portion so that the receiving portion of the bus bar and the projection of the electric storage element are fitted together, thereby positioning the bus bar relative to the electric storage element (see, for example, JP 2011-71104 A).

However, the above-mentioned method may require work to adjust the arrangement of the electric storage element in the manufacture of the electric storage device in some cases. In the worst case, the electric storage element and the bus bar may fail to be appropriately connected to each other.

This problem is more specifically described below. In the conventional method, based on the premise that the relative arrangement between the bus bar (connection region) and the electric storage element (external terminal) is maintained always constant, the receiving portion of the bus bar is provided adjacent to the connection region and the projection of the electric storage element is provided adjacent to the external terminal. Therefore, if the electric storage element is mispositioned, or the arrangement of the receiving portion is displaced from a predetermined position due to poor machining accuracy, the positional relationship between the external terminal and the receiving portion may fail to be consistent with the positional relationship between the external terminal and the projection in some cases. That is, even if the bus bar (connection region) is arranged so as to be connectable to the external terminal, there may be some cases where the bus bar cannot be positioned relative to the external terminal because of failure to insert the projection into the receiving portion.

Therefore, the conventional production method sometimes requires not only adjusting the arrangement of the bus bar but also appropriately adjusting the arrangement of the electric storage element when arranging the bus bar. Further, the electric storage element may sometimes be supplied in a state of being already positioned at a given position. In such a case, the arrangement of the electric storage element cannot be adjusted to the arrangement of the bus bar, as a result of which the bus bar may fail to be connected appropriately to the external terminal of the electric storage element.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In view of such circumstances, the present invention provides a spacer and a method for producing an electric storage device that allows a bus bar to be connected with an appropriate arrangement with respect to an external terminal of an electric storage element. Also, the present invention provides an electric storage device that allows a bus bar to be connected with an appropriate arrangement with respect to an external terminal of an electric storage element.

According to an aspect of the present invention, there is provided a method for producing an electric storage device that includes: an electric storage element having an external terminal; and a bus bar connected to the external terminal. The method includes the steps of: arranging a resin member; arranging the bus bar on the external terminal; and connecting the bus bar to the external terminal, wherein: at least one of the resin member and the bus bar has a projection; at least the other one of the resin member and the bus bar has a receiving portion capable of accommodating the projection; in the step of arranging the resin member, the resin member is positioned relative to the electric storage element so that a positional relationship between the external terminal and the projection corresponds to a positional relationship between the external terminal and the receiving portion; and in the step of arranging the bus bar on the external terminal, the projection is inserted into the receiving portion.

BRIEF DESCRIPTION OF THE DRAWINGS

The foregoing and other features of the present invention will become apparent from the following description and drawings of an illustrative embodiment of the invention in which:

FIG. 4 is a perspective view showing a first bus bar, as a component of the battery module of the aforementioned embodiment, for connecting the battery cells to each other;

FIG. 7 is a perspective view showing a second spacer, as a component of the battery module of the aforementioned embodiment, arranged between the battery cells;

FIGS. 10A to 10C are each an enlarged partial view showing the battery module of the aforementioned embodiment in the manufacturing process, in which: FIG. 10A is an enlarged partial sectional view showing the state where the first bus bar is mounted over two external terminals of the battery cells that are adjacent to each other; FIG. 10B is an enlarged partial sectional view showing the state where the first bus bar is welded to the external terminals; and FIG. 10C is an enlarged partial sectional view showing the state where a screw member as a conductor is inserted into the receiving portion of the first bus bar and a wiring member is connected to the first bus bar;

FIGS. 11A to 11C are each an enlarged partial view showing the battery module of the aforementioned embodiment in the manufacturing process, in which: FIG. 11A is an enlarged partial sectional view showing the state where the second bus bar is mounted over two external terminals of the battery cells that are adjacent to each other; FIG. 11B is an enlarged partial sectional view showing the state where the second bus bar is welded to the external terminals; and FIG. 11C is an enlarged partial sectional view showing the state where a screw member as a conductor is inserted into the receiving portion of the second bus bar and a wiring member is connected to the second bus bar;

FIGS. 12A to 12C are each an enlarged partial view showing the battery module according to another embodiment in the manufacturing process, in which: FIG. 12A is an enlarged partial sectional view showing the state where a bus bar is mounted over two external terminals of the battery cells that are adjacent to each other; FIG. 12B is an enlarged partial sectional view showing the state where the bus bar is welded to the external terminals; and FIG. 12C is an enlarged partial sectional view showing the state where a screw member as a conductor is inserted into the receiving portion of the bus bar and a wiring member is connected to the bus bar;

DESCRIPTION OF EMBODIMENTS

Figure 1:
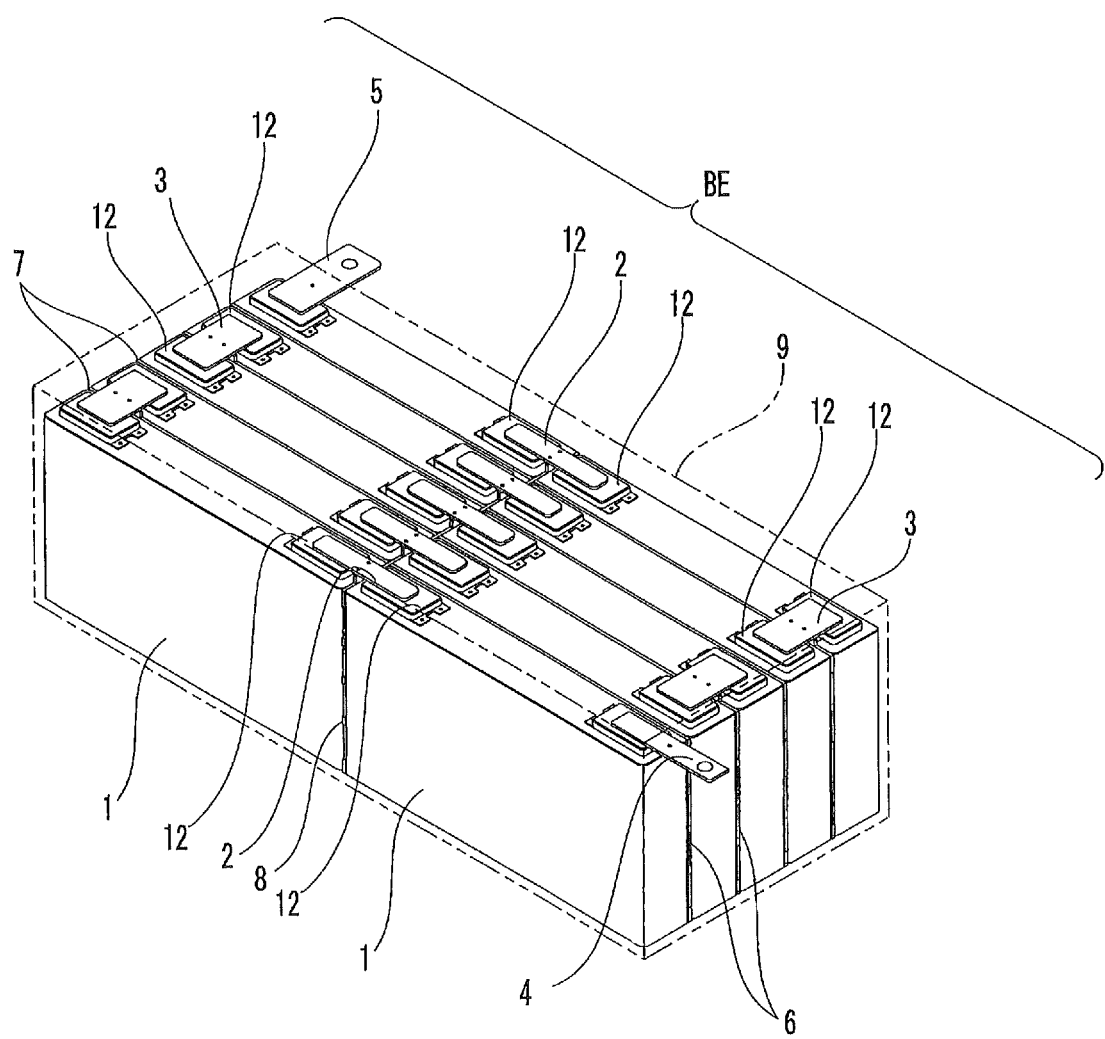
FIG. 1 is a perspective view showing a battery module according to one embodiment of the present invention.

According to an aspect of the present invention, there is provided a method for producing an electric storage device that includes: an electric storage element having an external terminal; and a bus bar connected to the external terminal. The method includes the steps of: arranging a resin member; arranging the bus bar on the external terminal; and connecting the bus bar to the external terminal, wherein: at least one of the resin member and the bus bar has a projection; at least the other one of the resin member and the bus bar has a receiving portion capable of accommodating the projection; in the step of arranging the resin member, the resin member is positioned relative to the electric storage element so that a positional relationship between the external terminal and the projection corresponds to a positional relationship between the external terminal and the receiving portion; and in the step of arranging the bus bar on the external terminal, the projection is inserted into the receiving portion.

According to the above-mentioned production method, in the case where the resin member has a projection and the bus bar has a receiving portion, the resin member is positioned relative to the electric storage element in the step of arranging the resin member, thereby allowing the positioning to be performed in the state where the projection of the resin member is arranged so as to correspond to the receiving portion of the bus bar arranged on the external terminal. That is, the projection of the resin member is positioned at a position where the receiving portion is supposed to be present when the bus bar is appropriately connected to the external terminal of the electric storage element. In the case where the resin member has a receiving portion and the bus bar has a projection, the resin member is positioned relative to the electric storage element in the step of arranging the resin member, thereby allowing the positioning to be performed in the state where the receiving portion of the resin member is arranged so as to correspond to the projection of the bus bar arranged on the external terminal. That is, the receiving portion of the resin member is positioned at a position where the projection is supposed to be present when the bus bar is appropriately connected to the external terminal of the electric storage element. Thus, the projection is inserted into the receiving portion in the step of arranging the bus bar to the external terminal, thereby allowing the bus bar to be positioned with an appropriate arrangement with respect to the external terminal. Accordingly, in the step of connecting the bus bar to the external terminal, the bus bar is connected with an appropriate arrangement with respect to the external terminal.

In one aspect of the present invention, the resin member may be a spacer arranged between two adjacent electric storage elements. In this way, the resin member and the spacer can be integrated into one member, and thus an increase in the number of parts can be suppressed.

Further, the spacer is interposed between the two electric storage elements, which allows the spacer to be positioned relative to the electric storage elements that are adjacent to each other (the two electric storage elements). As a result, the positional relationship between each external terminal and the projection is consistent with the positional relationship between the external terminal and the receiving portion of the bus bar. Accordingly, the bus bar is positioned with an appropriate arrangement with respect to each of the external terminals of the two electric storage elements by inserting the projection into the receiving portion.

In another aspect of the present invention, the bus bar may be arranged such that the bus bar extends over the external terminals of two adjacent electric storage elements in the step of arranging the bus bar to the external terminal. In this way, the bus bar can be positioned with an appropriate arrangement with respect to the external terminals of two adjacent electric storage elements.

There is another aspect of the present invention in which: the resin member has the projection; the bus bar has the receiving portion that serves as a conductor connection receiving portion for conductor connection; in the step of arranging the bus bar to the external terminal, the projection is inserted into the conductor connection receiving portion; and in the step of connecting the bus bar to the external terminal or a subsequent step, the projection in the conductor connection receiving portion is removed. In this way, the projection in the receiving portion is removed, leading to the state where the receiving portion into which the projection has been inserted turns to be an open hole so that a conductor can be inserted into the receiving portion. Accordingly, the conductor connection receiving portion can also be used as a hole for positioning, and thus there is no need to machine the bus bar for positioning the bus bar.

In this case, the bus bar may be welded to the external terminal, so that the projection in the conductor connection receiving portion is melted due to heat of the welding, in the step of connecting the bus bar to the external terminal. Thus, the projection is melted, and thereby the projection is removed from the conductor connection receiving portion. This allows the receiving portion into which the projection has been inserted to turn to be an open hole, so that insertion of a conductor into the receiving portion is enabled. Accordingly, the conductor connection receiving portion can be turned to be an open hole without need of another step after the step of connecting the bus bar with respect to the external terminal.

A step of inserting a conductor into the conductor connection receiving portion from which the projection has been removed may be further provided. The conductor is then electrically connected to the bus bar by inserting the conductor into the receiving portion. Accordingly, various measurement wires or the like can be connected to the bus bar via the conductor.

The spacer according to an aspect of the present invention includes a body portion interposed between two electric storage elements each having an external terminal; and a projection capable of being inserted into a receiving portion of a bus bar arranged such that the bus bar extends over the external terminals of the two electric storage elements, the projection being provided on the body portion.

The spacer with the above-mentioned configuration is positioned relative to the two electric storage elements by its body portion being interposed between the two electric storage elements. This allows the positional relationship between each external terminal and the projection to be consistent with the positional relationship between the external terminal and the receiving portion of the bus bar. Thus, when the bus bar is arranged on the external terminal, the bus bar is positioned with an appropriate arrangement with respect to the external terminal by inserting the projection into the receiving portion. Accordingly, the bus bar is connected with an appropriate arrangement with respect to the external terminal of the electric storage element.

According to another aspect of the present invention, there is provided a spacer, which includes: a body portion interposed between two electric storage elements each having an external terminal; and a receiving portion capable of accommodating a projection of a bus bar arranged such that the bus bar extends over the external terminals of the two electric storage elements, the receiving portion being provided on the body portion.

The spacer with the above-mentioned configuration is positioned relative to the two electric storage elements by its body portion being interposed between the two electric storage elements. This allows the positional relationship between each external terminal and the receiving portion to be consistent with the positional relationship between the external terminal and the projection of the bus bar. Thus, when the bus bar is arranged on the external terminals, the bus bar is positioned with an appropriate arrangement with respect to the external terminals by inserting the projection into the receiving portion. Accordingly, the bus bar is connected with an appropriate arrangement with respect to the external terminals of the electric storage elements.

In the case where the spacer is provided with the projection, the projection may be configured to be capable of being inserted into the receiving portion provided as a conductor connection receiving portion in the bus bar that is welded to the external terminal, and at least the projection has thermofusibility. The projection is then melted due to heat generated in welding (connecting) the bus bar to the external terminal, so that the receiving portion turns to be an open hole. This allows the conductor to be connected to the receiving portion of the bus bar welded to the external terminals. Accordingly, the conductor connection receiving portion can also be used as a hole for positioning, and thus there is no need to machine the bus bar for positioning the bus bar.

In one aspect of the spacer according to the present invention, the body portion may have a vent passage that extends in a direction intersecting the direction in which the two electric storage elements are aligned, thereby forming through passages of the body portion. The electric storage elements then can be cooled by a gas passing through the vent passage of the spacer arranged between the electric storage elements.

According to the present invention, there is further provided an electric storage device, which includes: at least two electric storage elements each having an external terminal; a spacer arranged between the electric storage elements that are adjacent to each other; and a bus bar connected to each external terminal while extending over the external terminals of the two electric storage elements, wherein the spacer is any one of the above-mentioned spacers.

According to the electric storage device with the above-mentioned configuration, when the bus bar is connected to the external terminal, the bus bar is maintained with an appropriate arrangement with respect to the external terminal, as mentioned above. Accordingly, the bus bar is connected with an appropriate arrangement with respect to the external terminal of the electric storage element. Further, in the case where the projection is configured to be melted, a conductor can be connected to the receiving portion of the bus bar that has been welded to the external terminal, as mentioned above. Further, in the case where the vent passage is formed in the body portion of the spacer, the electric storage elements can be cooled by a gas passing through the vent passage, resulting in a stable output.

As has been mentioned above, aspects of the present invention can provide a method for producing an electric storage device, in which a bus bar can be connected with an appropriate arrangement with respect to an external terminal of an electric storage element. Also, a spacer that allows the bus bar to be connected with an appropriate arrangement with respect to the external terminal of the electric storage element can be provided. Furthermore, an electric storage device in which the bus bar is connected with an appropriate arrangement with respect to the external terminal of the electric storage element can be provided.

Figure 2:
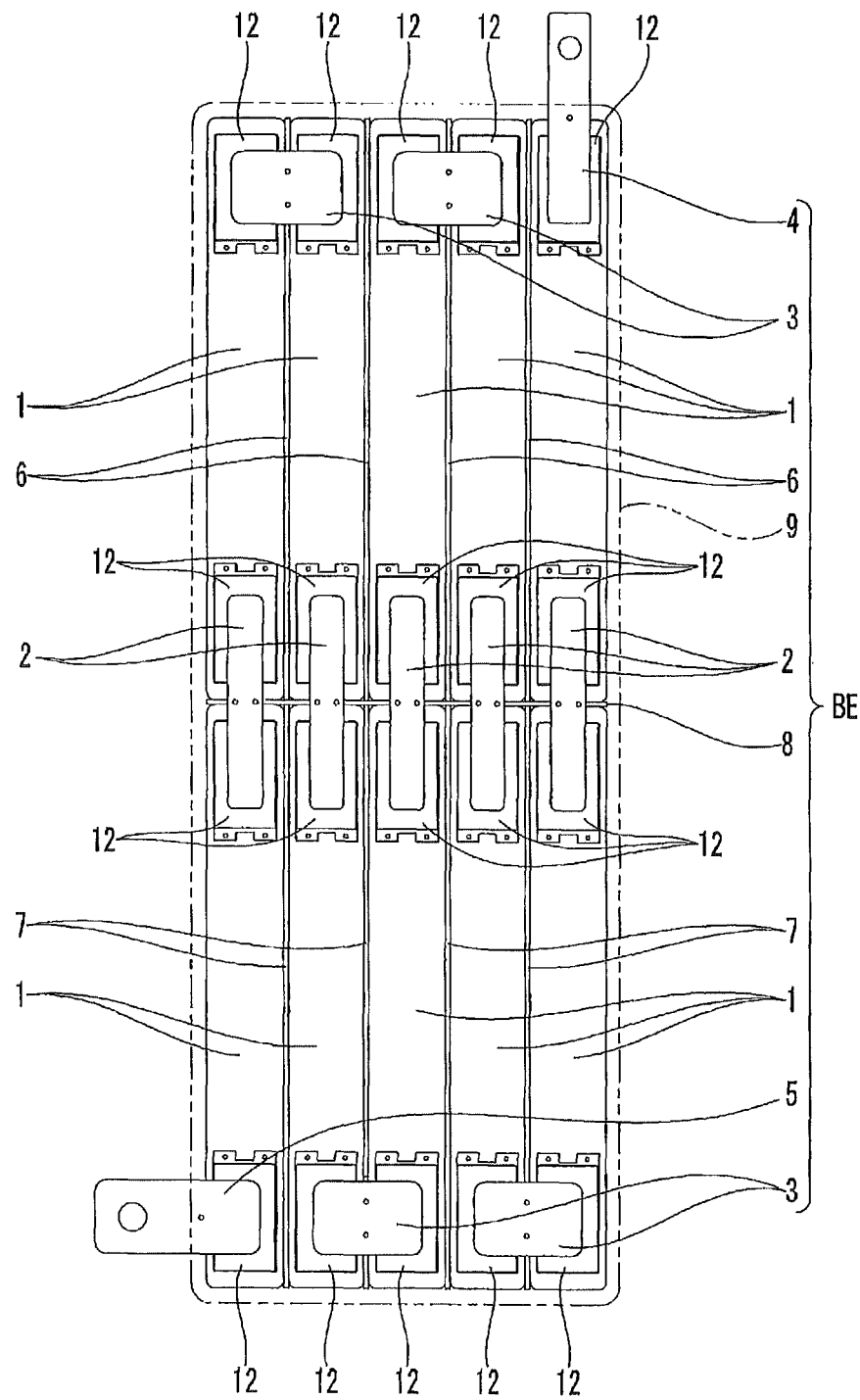
FIG. 2 is a plan view showing the aforementioned battery module.

Hereinafter, a battery module as one embodiment of the electric storage device according to the present invention is described with reference to the drawings. As shown in FIG. 1 and FIG. 2, the battery module according to this embodiment includes a plurality of battery cells (electric storage elements) 1, bus bars 2, 3, 4, and 5 that are connected to the battery cells 1, spacers 6, 7, and 8 that are arranged between the battery cells 1, and a housing 9 that houses the plurality of battery cells 1, the bus bars 2, 3, 4, and 5, and the spacers 6, 7, and 8.

Figure 3:
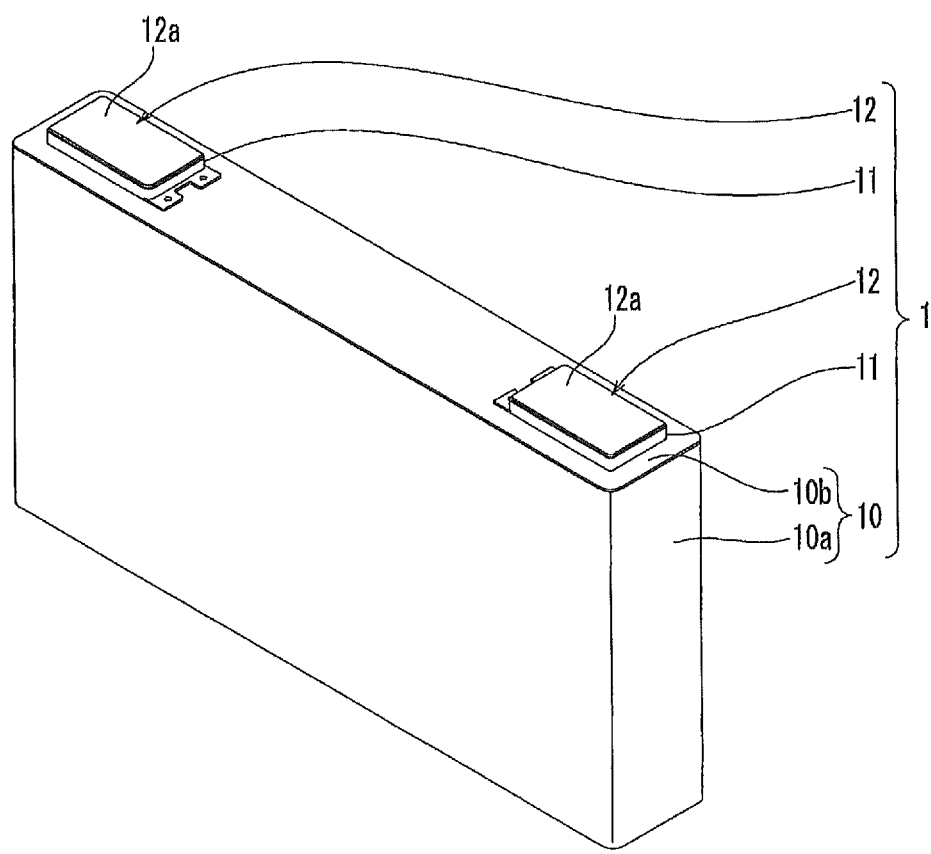
FIG. 3 is a perspective view showing a battery cell as a component of the aforementioned battery module.

As shown in FIG. 3, each battery cell 1 includes a case 10 composed of a case body 10a that has an opening and a cover plate 10b that closes and seals the opening of the case body 10a. The case 10 houses an electrode assembly (not shown in the drawings) that includes a positive electrode plate and a negative electrode plate. In the electrode assembly of this embodiment, the positive electrode plate has an active material layer containing lithium metal oxide, and the negative electrode plate has an active material layer containing a carbon material such as graphite. That is, the battery cell (electric storage element) 1 according to this embodiment is a lithium-ion secondary battery cell.

As the battery cell 1, a rectangular battery cell that is cuboidal in appearance or a cylindrical battery cell that is columnar in appearance can be employed. The battery cell 1 according to this embodiment is a rectangular battery cell. Therefore, the case body 10a is in the form of a bottomed rectangular tube that is flat in the width direction, and the cover plate 10b is a plate having a rectangular shape that corresponds to the opening of the case body 10a.

An external gasket 11 is arranged on the outer surface of the cover plate 10b. An external terminal 12 is arranged on the external gasket 11. In this embodiment, the external gasket 11 has a recess. The external terminal 12 is disposed within the recess. The external terminal 12 is formed of aluminum or an aluminum metal material of aluminum alloy. In this embodiment, it is formed so that the portion in contact with the bus bar 2, 3, 4, or 5 (portion to be welded) should be flat. The external terminal 12 has a shaft portion (not shown) that passes through the external gasket 11 and the cover plate 10b and is electrically connected to the electrode assembly inside the case 10.

The battery cell 1 is provided with the external gasket 11 and the external terminal 12 for each of the positive electrode and the negative electrode. The external gasket 11 and the external terminal 12 for the positive electrode are arranged at one end portion in the longitudinal direction of the cover plate 10b. The external gasket 11 and the external terminal 12 for the negative electrode are arranged at the other end portion in the longitudinal direction of the cover plate 10b.

The external gasket 11 and the external terminal 12 are each quadrangular in plan view. In this embodiment, the external gasket 11 and the external terminal 12 are each rectangular in plan view. Their longitudinal directions each coincide with the longitudinal direction of the cover plate 10b. The external terminal 12 projects from the external gasket 11. That is, the outer surface (hereinafter referred to as the upper surface) 12a of the external terminal 12 is located at a distance from the outer surface of the cover plate 10b. The upper surface 12a of the external terminal 12 is flat. The upper surface 12a of the external terminal 12 for the positive electrode and the upper surface 12a of the external terminal 12 for the negative electrode are on the same plane (the same height level).

Returning to FIG. 1 and FIG. 2, the plurality of battery cells 1 are arrayed in rows and columns. In this embodiment, ten battery cells 1 are arranged in two rows and five columns. The battery cells 1 that form each row are aligned in the direction orthogonal to the longitudinal direction of the cover plate 10b, and the battery cells 1 that form each column are aligned in the longitudinal direction of the cover plate 10b. The plurality of the battery cells 1 aligned in the row direction are arranged with the polarity of the external terminals 12 inverted in every column, so that the external terminals 12, facing each other, of the battery cells 1 that are adjacent to each other in the row direction have different polarities. Further, the plurality of battery cells 1 aligned in the column direction are arranged with the polarity of the external terminals 12 inverted in every row, so that the external terminals 12, facing each other, of the battery cells 1 that are adjacent to each other in the column direction have different polarities. In this way, the external terminals 12 that are adjacent to each other are connected together, thereby allowing the plurality of battery cells 1 to be connected serially (to form one battery).

An electric storage device BE in this embodiment includes at least two types of the bus bars 2, 3, 4, and 5. Specifically, the electric storage device BE includes the first bus bar 2 that connects the external terminals 12 of the battery cells 1 aligned in the column direction, and the second bus bar 3 that connects the external terminals 12 of the battery cells 1 aligned in the row direction.

More specifically, the electric storage device BE includes: the first bus bar 2 that connects the external terminal 12 for the positive electrode of one of the battery cells 1 that are adjacent to each other in the column direction and the external terminal 12 for the negative electrode of the other one of the battery cells 1 together, where the external terminals 12 are closely spaced; and the second bus bar 3 that connects the external terminal 12 for the positive electrode of one of the battery cells 1 that are adjacent to each other in the row direction and the external terminal 12 for the negative electrode of the other one of the battery cells 1 together, where the external terminals 12 are closely spaced. Further, the electric storage device BE according to this embodiment includes the third bus bar 4 for the positive electrode and the fourth bus bar 5 for the negative electrode, respectively as bus bars for connection to external loads (such as another battery module BE, another device, and another power source). More specifically, the electric storage device BE according to this embodiment includes the third bus bar 4 connected to the external terminal 12 that serves as the start terminal of an electrical system when the plurality of battery cells 1 are serially connected, and the fourth bus bar 5 connected to the external terminal 12 that serves as the end terminal of the electrical system.

The first bus bar 2 is formed of a metal material having electrical conductivity. In this embodiment, the first bus bar 2 is formed of a plate made of aluminum or an aluminum metal material of aluminum alloy. As shown in FIG. 4, the first bus bar 2 has an intermediate region 20 and a pair of connection regions 21 provided at both ends of the intermediate region 20. Each connection region 21 is a portion to be connected to the upper surface 12a of the external terminal 12 in the state of being mounted thereon. In this embodiment, the surface of the connection region 21 to be mounted on the external terminal 12 is made flat in correspondence with the external terminal 12. The intermediate region 20 is a portion that connects the pair of connection regions 21, and that adjust the distance between the pair of connection regions 21 to correspond to the distance between the external terminals 12 of the battery cells 1 that are closely adjacent to each other in the column direction. In the first bus bar 2, each connection region 21 is set smaller in size than the upper surface 12a of the external terminal 12, and formed so that a region to serve as an edge or margin left for applying welding (welding edge) is ensured in its periphery when being arranged on the upper surface 12a of the external terminal 12. In this embodiment, the intermediate region 20 and the connection regions 21 are continuously formed with the same width, and the first bus bar 2 as a whole is formed into a rectangular shape in plan view.

A receiving portion 22 composed of a through hole in the thickness direction is formed in the intermediate region 20 of the first bus bar 2. A fastening member (a conductor) having electrical conductivity such as a screw member or a rivet for securing a terminal (not shown) of a temperature sensing wire or a voltage sensing wire connected to a monitoring device (CMU: Cell Monitor Unit) is attached to the receiving portion 22. Accordingly, in the case where a rivet is employed as the fastening member, the receiving portion 22 is formed as a through hole; in the case where a screw member is employed as the fastening member, the receiving portion 22 is formed as an internally threaded non-through hole or an internally threaded through hole.

In this embodiment, a screw member is employed as the fastening member. Following this, the receiving portion 22 has an internally threaded wall. In the case where the fastening member is a screw member, the receiving portion 22 may be either a through hole or a non-through hole, while in this embodiment, a through hole is employed. In this embodiment, two receiving portions 22 are formed in the intermediate region 20 of the first bus bar 2. A fastening member that secures a terminal of a voltage sensing wire is attached to one of the two receiving portions 22, and a fastening member that secures a terminal of a temperature sensing wire is attached to the other one of the receiving portions 22.

Figure 5:
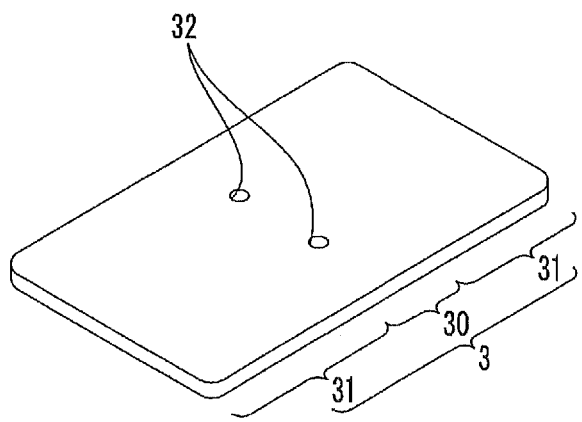
FIG. 5 is a perspective view showing a second bus bar, as a component of the battery module of the aforementioned embodiment, for connecting the battery cells to each other.

The second bus bar 3 is formed of a metal material having electrical conductivity. In this embodiment, the second bus bar 3 is formed of a plate made of aluminum or an aluminum metal material of aluminum alloy. As shown in FIG. 5, the second bus bar 3 has an intermediate region 30 and a pair of connection regions 31 provided at both ends of the intermediate region 30. Each connection region 31 is a portion to be connected to the upper surface 12a of the external terminal 12 in the state of being mounted thereon. The intermediate region 30 is a portion that connects the pair of connection regions 31, and that adjust the distance between the pair of connection regions 31 to correspond to the distance between the external terminals 12 of the battery cells 1 that are closely adjacent to each other in the row direction. Also in the second bus bar 3, each connection region 31 is set smaller in size than the upper surface 12a of the external terminal 12, and formed so that a region to serve as a welding edge is ensured in its periphery when being arranged on the upper surface 12a of the external terminal 12. In this embodiment, the intermediate region 30 and the connection regions 31 are continuously formed with the same width, and the second bus bar 3 as a whole is formed into a rectangular shape in plan view. As has been mentioned above, each external terminal 12 is formed into a rectangular shape in plan view, and arranged in the state where its longitudinal direction coincides with the longitudinal direction of the cover plate 10b (which corresponds to the column direction). Following this, an external dimension of the external terminal in a direction orthogonal to the longitudinal direction of the second bus bar 3 is made larger than an external dimension of the external terminal in a direction orthogonal to the longitudinal direction of the first bus bar 2.

A receiving portion 32 composed of through holes in the thickness direction is formed in the intermediate region 30 of the first bus bar 3. A fastening member (a conductor) having electrical conductivity such as a screw member or a rivet for securing a terminal (not shown) of a temperature sensing wire or a voltage sensing wire connected to a monitoring device is attached to the receiving portion 32. Accordingly, in the case where a rivet is employed as the fastening member, the receiving portion 32 is formed as a through hole; in the case where a screw member is employed as the fastening member, the receiving portion 32 is formed as an internally threaded non-through hole or an internally threaded through hole.

In this embodiment, a screw member is employed as the fastening member. Following this, the receiving portion 32 has a screw-threaded internal surface. In the case where the fastening member is a screw member, the receiving portion 32 may be either a through hole or a non-through hole. In this embodiment, a through hole is employed. In this embodiment, two receiving portions 32 are formed in the intermediate region 30 of the second bus bar 3. A fastening member that secures a terminal of a voltage sensing wire is attached to one of this two receiving portions 32, and a fastening member that secures a terminal of a temperature sensing wire is attached to the other one of the receiving portions 32.

Returning to FIG. 1 and FIG. 2, the third bus bar 4 is formed of a plate made of aluminum or an aluminum metal material of aluminum alloy, in the same manner as the first bus bar 2 and the second bus bar 3. The third bus bar 4 is connected to the external terminal 12 that serves as the start terminal of the electrical system, with its longitudinal direction coincident with the longitudinal direction of the first bus bar 2. The third bus bar 4 has a portion to be connected to an external load, which portion extends out of the housing 9. Further, the fourth bus bar 5 is formed of a plate made of aluminum or an aluminum metal material of aluminum alloy, in the same manner as the first bus bar 2 and the second bus bar 3.

The fourth bus bar 5 is connected to the external terminal 12 that serves as the end terminal of the electrical system, with its longitudinal direction coincident with the longitudinal direction of the second bus bar 3. The fourth bus bar 5 also has a portion to be connected to an external load, which portion extends out of the housing 9.

In this embodiment, the plurality of battery cells 1 are arranged in rows and columns. Following this, the electric storage device BE includes spacers 6, 7, and 8. The spacer 6 and 7 are arranged between the battery cells 1 aligned in the row direction, and the spacer 8 is arranged between the battery cells aligned in the column direction 1. That is, the electric storage device BE includes the spacers 6 and 7 arranged between the battery cells 1 in different columns and the spacer 8 arranged between the battery cells 1 in different rows.

In this embodiment, the spacers 6 or 7 arranged between the battery cells 1 in different columns are provided in each unit of row. More specifically, the plurality of battery cells 1 are arranged in two rows and five columns in this embodiment. Following this, the electric storage device BE, in one of the two rows, includes the spacers (hereinafter referred to as the first spacers) 6 arranged between the battery cells 1 in different columns, and the electric storage device BE, in the other one of the two rows, includes the spacers (hereinafter referred to as the second spacers) 7 arranged between the battery cells 1 in different columns. The spacer (hereinafter referred to as the third spacer) 8 arranged between the two battery cells 1 in different rows is configured as a single spacer for partitioning between different rows.

Figure 6:
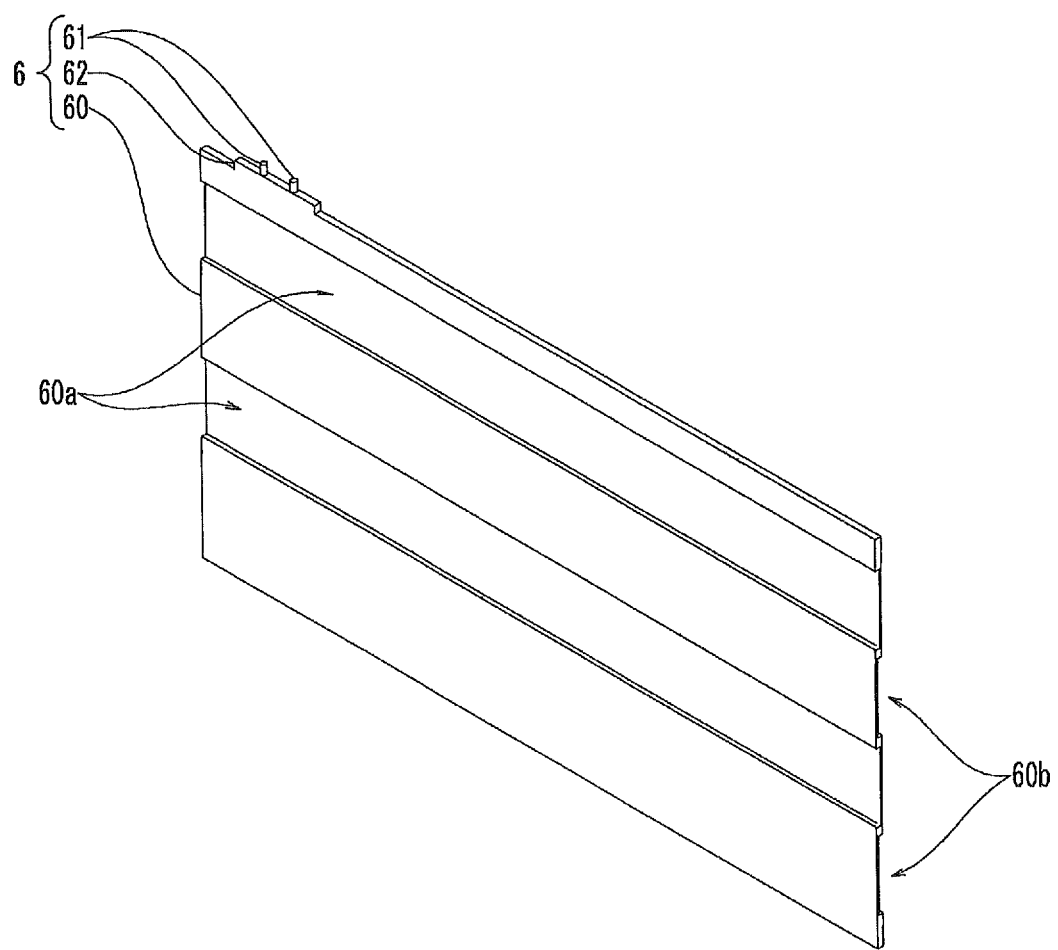
FIG. 6 is a perspective view showing a first spacer, as a component of the battery module of the aforementioned embodiment, arranged between the battery cells.

As shown in FIG. 6, each first spacer 6 includes a body portion 60 interposed between two of the battery cells 1 that are adjacent to each other, and projections 61 that are continuously provided directly or indirectly to the body portion 60 and that are configured to be insertable into the receiving portions 32 provided in the second bus bar 3 arranged extending over the external terminals 12 of the two battery cells 1.

The body portion 60 of the first spacer 6 is formed into a plate, and has a first surface and a second surface on the opposite side to the first surface. The body portion 60 (the first surface and the second surface) is formed into a flat shape corresponding to the contour of the outer wall surface of the case 10 in each of the battery cells 1 aligned in the row direction. In this embodiment, the case body 10*a* is in the form of a bottomed rectangular tube that is flat in the width direction. Following this, the outer wall surface of the case 10 (the case body 10*a*) that faces in the row direction of the battery cells 1 is quadrangular. Following this, the body portion 60 of the first spacer 6 is quadrangular in plan view so as to be able to face the whole of a single outer wall surface of the case 10 of the battery cell 1.

The body portion 60 of the first spacer 6 has a first edge in a first direction that is orthogonal to the column direction and the row direction in which the battery cells 1 are arrayed, a second edge on the opposite side to the first edge, a third edge in a second direction that corresponds to the column direction and that is orthogonal to the first direction, a fourth edge on the opposite side to the third edge. The body portion 60 of the first spacer 6 determines the distance between the battery cells 1. That is, the thickness of the body portion 60 is set in correspondence with the distance between the battery cells 1 aligned in the row direction.

In this embodiment, the body portion 60 of the first spacer 6 has vent passages 60*a* and 60*b* passing thereacross in a direction intersecting the direction in which the two battery cells 1 that are adjacent to each other in the row direction are arrayed (orthogonal direction). More specifically, the first surface of the body portion 60 is provided with the vent passage 60*a* in the form of a groove, and the second surface of the body portion 60 is provided with the vent passage 60*b* in the form of a groove. The vent passages 60*a* and 60*b* are formed to extend in the second direction, thereby forming through passages of the body portion 60 in the same direction. The vent passage 60*a* on the first surface and the vent passage 60*b* on the second surface are arranged in a staggered manner in the first direction.

The projections 61 of the first spacer 6 are provided so as to correspond to the arrangement of the receiving portions 32 of the second bus bar 3 that connects the battery cells 1 in one row. More specifically, a supporting portion 62 is provided on the first edge of the body portion 60 at a position corresponding to the arrangement of one of the external terminals 12 of the battery cells 1 aligned in one row. Each projection 61 projects outwardly from the supporting portion 62 in the first direction. In this embodiment, as has been mentioned above, two receiving portions 32 are provided in the second bus bar 3. Following this, the first spacer 6 is provided with two projections 61. The two projections 61 are arranged in the second direction at an interval so as to correspond to the arrangement of the receiving portions 32.

In the first spacer 6, at least the projections 61 have thermofusibility. That is, the projections 61 are each composed of a thermoplastic resin. In this embodiment, the body portion 60 and the supporting portion 62 also are each composed of a thermoplastic resin. That is, the first spacer 6 is entirely formed of a thermoplastic resin.

As shown in FIG. 7, each second spacer 7 includes a body portion 70 interposed between two of the battery cells 1 that are adjacent to each other, and projections 71 that are continuously provided directly or indirectly to the body portion 70 and that are configured to be insertable into the receiving portions 32 provided in the second bus bar 3 arranged extending over the external terminals 12 of the two battery cells 1.

The body portion 70 of the second spacer 7 is formed into a plate, and has a first surface and a second surface on the opposite side to the first surface. The body portion 70 (the first surface and the second surface) is formed into a flat shape corresponding to the contour of the outer wall surface of the case 10 in each of the battery cells 1 aligned in the row direction. In this embodiment, the case body 10*a* is in the form of a bottomed rectangular tube that is flat in the width direction. Following this, the outer wall surface of the case 10 (the case body 10*a*) that faces in the row direction of the battery cells 1 is quadrangular. Following this, the body portion 70 of the second spacer 7 is quadrangular in plan view so as to be able to face the whole of a single outer wall surface of the case 10 of the battery cell 1.

That is, the body portion 70 of the second spacer 7 has a first edge in the first direction, a second edge on the opposite side to the first edge, a third edge in the second direction, and a fourth edge on the opposite side to the third edge. The body portion 70 of the second spacer 7 determines the distance between the battery cells 1. That is, the thickness of the body portion 70 is set in correspondence with the distance between the battery cells 1 aligned in the row direction.

In this embodiment, the body portion 70 of the second spacer 7 has vent passages 70*a* and 70*b* as through passages of the body portion 70 in the second direction. More specifically, the first surface of the body portion 70 is provided with the vent passage 70*a* in the form of a groove, and the second surface of the body portion 70 is provided with the vent passage 70*b* in the form of a groove. The vent passages 70*a* and 70*b* are formed to extend in the second direction, thereby forming through passages of the body portion 70 in the same direction. The vent passage 70*a* on the first surface and the vent passage 70*b* on the second surface are arranged in a staggered manner in the first direction. The vent passages 70*a* and 70*b* of the second spacer 7 are arranged so as to be aligned in the same column as the vent passages 60*a* and 60*b* of the first spacer 6. That is, the vent passage 70*a* on the first surface of the second spacer 7 is arranged so as to be aligned in one column with the vent passage 60*a* on the first surface of the first spacer 6 that faces in the same direction as the first surface of the second spacer 7. The vent passage 70*b* on the second surface of the second spacer 7 is arranged so as to be aligned in one column with the vent passage 60*b* on the second surface of the first spacer 6 that faces in the same direction as the second surface of the second spacer 7.

The projections 71 of the second spacer 7 are provided so as to correspond to the arrangement of the receiving portions 32 of the second bus bar 3 that connects the battery cells 1 in the other row. More specifically, a supporting portion 72 is provided on the first edge of the body portion 70 at a position corresponding to the arrangement of the other one of the external terminals 12 of the battery cells 1 aligned in the other row. Each projection 71 projects outwardly from the supporting portion 72 in the first direction. In this embodiment, as has been mentioned above, two receiving portions 32 are provided in the second bus bar 3. Following this, the second spacer 7 is provided with two projections 71. The two projections 71 are arranged in the second direction at an interval so as to correspond to the arrangement of the receiving portions 32.

In the second spacer 7, at least the projections 71 have thermofusibility. That is, the projections 71 are each composed of a thermoplastic resin. In this embodiment, the body portion 70 and the supporting portion 72 also are each composed of a thermoplastic resin. That is, the second spacer 7 is entirely formed of a thermoplastic resin.

Figure 8:
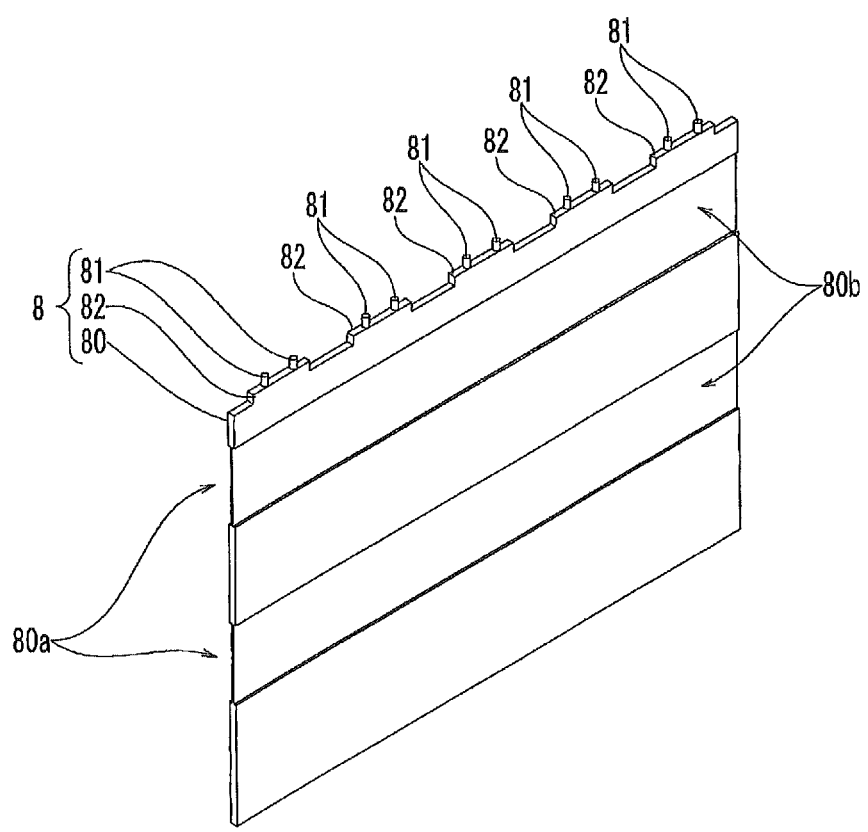
FIG. 8 is a perspective view showing a third spacer, as a component of the battery module of the aforementioned embodiment, arranged between the battery cells.

As shown in FIG. 8, the third spacer 8 includes a body portion 80 interposed between two of the battery cells 1 that are adjacent to each other, and projections 81 that are continuously provided directly or indirectly to the body portion 80 and that are configured to be insertable into the receiving portions 22 provided in the first bus bar 2 arranged extending over the external terminals 12 of the two battery cells 1.

The body portion 80 of the third spacer 8 is formed into a plate, and has a first surface and a second surface on the opposite side to the first surface. The body portion 80 (the first surface and the second surface) is formed into a flat shape corresponding to the contour of the outer wall surface of the case 10 in each of the battery cells 1 aligned in the column direction. The third spacer 8 according to this embodiment is configured to have a single structure serving as a partition between different rows. The group of the outer wall surfaces of the cases 10 (the case bodies 10*a*) oriented in the column direction (the second direction) of a plurality of columns of the battery cells 1 (a plurality of the battery cells 1 aligned in the same row) is quadrangular. Following this, the body portion 80 of the third spacer 8 is quadrangular in plan view so as to be able to face the outer wall surfaces of the cases 10 of the plurality of battery cells 1.

That is, the body portion 80 of the third spacer 8 has a first edge in the first direction, a second edge on the opposite side to the first edge, a third edge in a third direction that corresponds to the row direction and that is orthogonal to the first direction and the second direction, and a fourth edge on the opposite side to the third edge. The body portion 80 of the third spacer 8 determines the distance in the column direction between the battery cells 1. That is, the thickness of the body portion 80 is set in correspondence with the distance between the battery cells 1 aligned in the column direction.

In this embodiment, the body portion 80 of the third spacer 8 has vent passages 80*a* and 80*b* as through passages of the body portion 80 in the third direction. More specifically, the first surface of the body portion 80 is provided with the vent passage 80*a* in the form of a groove, and the second surface of the body portion 80 is provided with the vent passage 80*b* in the form of a groove. The vent passages 80*a* and 80*b* are formed to extend in the third direction, thereby forming through passages of the body portion 80 in the same direction. In the third spacer 8, the vent passage 80*a* on the first surface and the vent passage 80*b* on the second surface are arranged coincident with each other in the first direction. Following this, the vent passages 80*a* and 80*b* are provided in the third spacer 8, respectively corresponding to the arrangement of the vent passages 60*a* and 60*b* on the first surface and the second surface of the first spacer 6 in the first direction. In this way, the vent passages 60*a* and 60*b* on both sides of the first spacer 6 each communicate with (fluidically connected to) the vent passage 80*a* on the first surface of the third spacer 8, and the vent passages 70*a* and 70*b* on both sides of the second spacer 7 each communicate with (fluidically connected to) the vent passage 80*b* on the second surface of the third spacer 8, when the first spacers 6, the second spacers 7, and the third spacer 8 each are arranged between the battery cells 1.

The projections 81 of the third spacer 8 are provided so as to correspond to the arrangement of the receiving portions 22 of the first bus bar 2 that connects the battery cells 1 in the second direction (column direction). More specifically, a supporting portion 82 is provided on the first edge of the body portion 80 at a position corresponding to the arrangement of the battery cells 1 aligned in the row direction. In this embodiment, the third spacer 8 faces a plurality of the battery cells 1, and therefore a plurality of supporting portions 82 are provided respectively corresponding to the arrangement of the battery cells 1 that face the supporting portions 82. Each projection 81 projects outwardly from each supporting portion 82 in the first direction. In this embodiment, as has been mentioned above, two receiving portions 32 are provided in the first bus bar 2. Following this, the third spacer 8 is provided with two projections 81 for each supporting portion 82. The two projections 81 are arranged in the third direction at an interval so as to correspond to the arrangement of the receiving portions 32.

In the third spacer 8, at least the projections 81 have thermofusibility. That is, the projections 81 are each composed of a thermoplastic resin. In this embodiment, the body portion 80 and the supporting portion 82 also are each composed of a thermoplastic resin. That is, the third spacer 8 is entirely formed of a thermoplastic resin.

Figure 9:
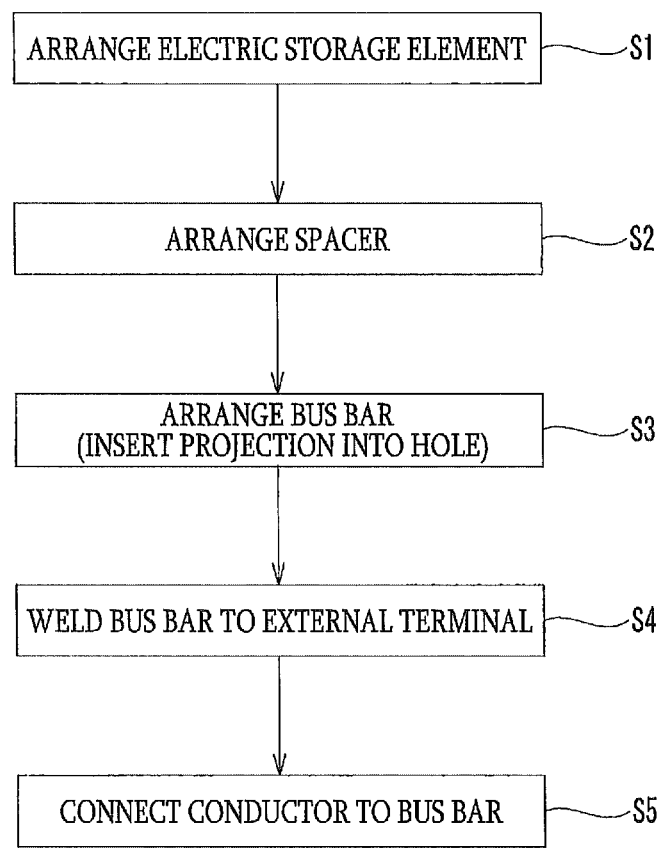
FIG. 9 is a process block diagram in manufacturing the battery module of the aforementioned embodiment.

The battery module BE according to this embodiment is configured as described above. Subsequently, a method for producing battery modules (electric storage devices) BE with the above-mentioned configuration is described. As indicated in FIG. 9, the battery cells 1 as electric storage devices are provided. That is, a plurality of the battery cells 1 are arranged in rows and columns (S1). In this embodiment, the plurality of battery cells 1 are arranged in two rows and five columns (S1).

At this time, each spacer 6, 7, or 8 as a resin member is positioned relative to each corresponding battery cell 1 so that the positional relationship between each external terminal 12 and each corresponding projection 61, 71 or 81 is consistent with the positional relationship between each external terminal 12 and the receiving portion 32 of each corresponding bus bar 3 (S2). That is, each spacer 6, 7, or 8 as a resin member is positioned relative to each corresponding battery cell 1 so that the distance from each external terminal 12 to the projection 61, 71 or 81 of each corresponding spacer 6, 7, or 8 and the distance from each external terminal 12 to the receiving portion 32 of each corresponding bus bar 3 should be equal or substantially equal to each other.

More specifically, each first spacer 6 is arranged between each two adjacent battery cells 1 that form one row, and each second spacer 7 is arranged between each two adjacent battery cells 1 that form the other row. In such a state, each body portion 60 or 70 of the first spacers 6 or the second spacers 7 is interposed between each two adjacent battery cells 1 aligned in the row direction. Accordingly, each first spacer 6 and each second spacer 7 are positioned relative to each corresponding battery cell 1 so that the positional relationship between each external terminal 12 of the battery cells 1 (each external terminal 12 associated with each corresponding supporting portion 62 or 72) and each corresponding projection 61 or 71 of the first spacers 6 or the second spacers 7 is consistent with the positional relationship between each external terminal 12 of the battery cells 1 (each external terminal 12 associated with each corresponding supporting portion 62 or 72) and each corresponding receiving portion 32 of the second bus bars 3 (the second bus bars 3 each to be connected to the aforementioned external terminal 12). That is, the first spacers 6 and the second spacers 7 are each positioned so that each two projections 61 or 71 of the first spacers 6 or the second spacers 7 are properly arranged at positions where each two receiving portions 32 of the second bus bars 3 are supposed to be positioned when the second bus bars 3 are appropriately arranged (S2).

Further, the third spacer 8 is arranged between two rows of the battery cells 1. In such a state, the body portion 80 of the third spacer 8 is interposed between the battery cells 1 adjacent to each other in the column direction (the battery cells 1 in different rows). Accordingly, the third spacer 8 is positioned relative to the battery cells 1 so that the positional relationship between each external terminal 12 of the battery cells 1 (each external terminal 12 associated with each corresponding supporting portion 82) and the projections 81 of the third spacer 8 is consistent with the positional relationship between each external terminal 12 of the battery cells 1 (each external terminal 12 associated with each corresponding supporting portion 82) and the receiving portions 22 of the bus bars 3 (the first bus bars 2 each to be connected to the aforementioned external terminal 12). That is, the third spacer 8 is positioned so that each two projections 81 of the third spacer 8 are properly arranged at positions where each two receiving portions 22 of the first bus bars 2 are supposed to be positioned when the first bus bar 2 is appropriately arranged (S2).

Then, each first bus bar 2 and each second bus bar 3 are arranged on the upper surface 12a of each corresponding external terminal 12 (S3). At this time, each projection 61, 71, or 81 of each spacer 6, 7, or 8 as a resin member is inserted into each corresponding receiving portion 22 or 32 of each first bus bar 2 or each second bus bar 3 (S3).

Specifically, each second bus bar 3 is arranged on the external terminals 12 of the battery cells 1 aligned in the row direction. In this way, when each second bus bar 3 is arranged, each projection 61 or 71 of each first spacer 6 or each second spacer 7 is inserted into the receiving portion 32 of each corresponding second bus bar 3. In this embodiment, the two projections 61 or 71 of each first spacer 6 or each second spacer 7 are inserted into the two receiving portions 32 of each corresponding second bus bar 3.

Further, each first bus bar 2 is arranged on the external terminals 12 of the battery cells 1 aligned in the column direction. In this way, when each first bus bar 2 is arranged, each projection 81 of the third spacer 8 is inserted into the receiving portion 22 of each corresponding first bus bar 2. In this embodiment, two projections 81 of each supporting portion 82 of the third spacer 8 are inserted into the two receiving portions 22 of the first bus bar 2.

Figure 10A:
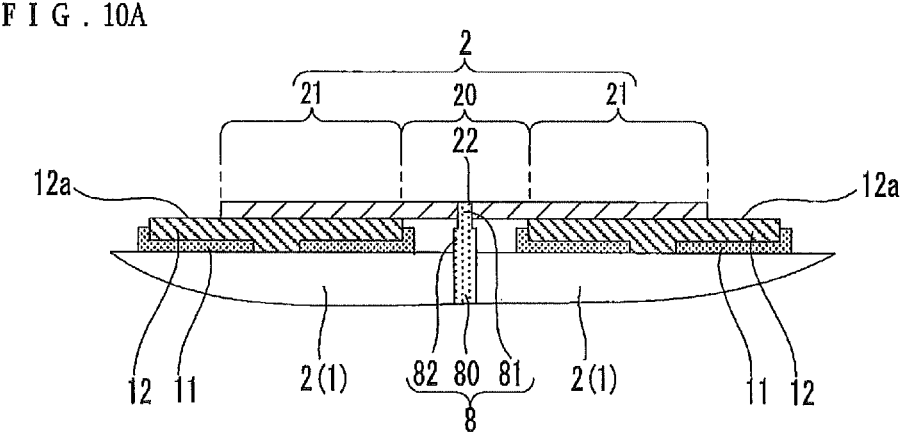
Figure 11A:
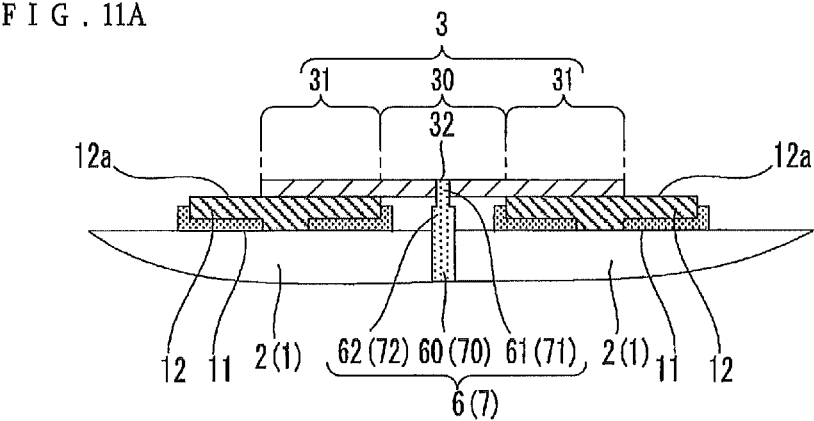

As described above, the respective projections 61, 71, and 81 of the first spacers 6, the second spacers 7, and the third spacer 8 that are each positioned relative to the battery cells 1 are inserted into the receiving portions 22 and 32 of the first bus bar 2 and the second bus bar 3, thereby limiting the free movement of each of the first bus bar 2 and the second bus bar 3, as shown in FIG. 10A and FIG. 11A. Accordingly, the first bus bar 2 and the second bus bar 3 each can be maintained at an appropriate position. Particularly in this embodiment, the respective two projections 61, 71, and 81 are inserted into the two receiving portions 22 and 32. Therefore, both the first bus bar 2 and the second bus bar 3 can be surely prevented from rotating around the projections 61 and 71.

Figure 10B:
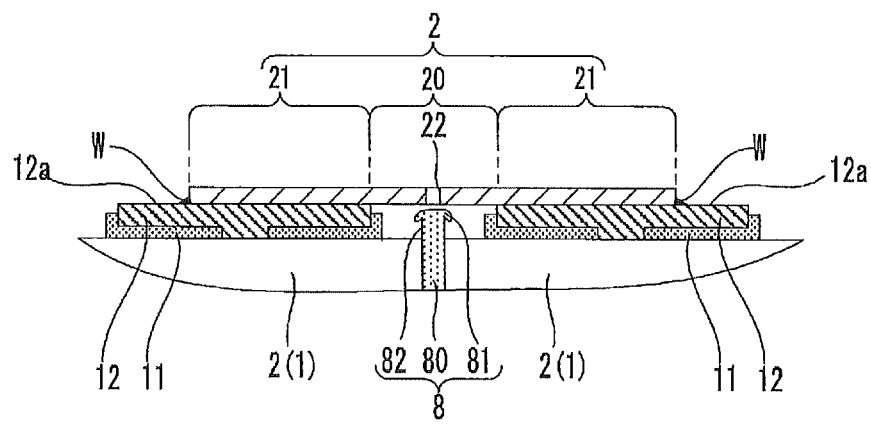
Figure 11B:
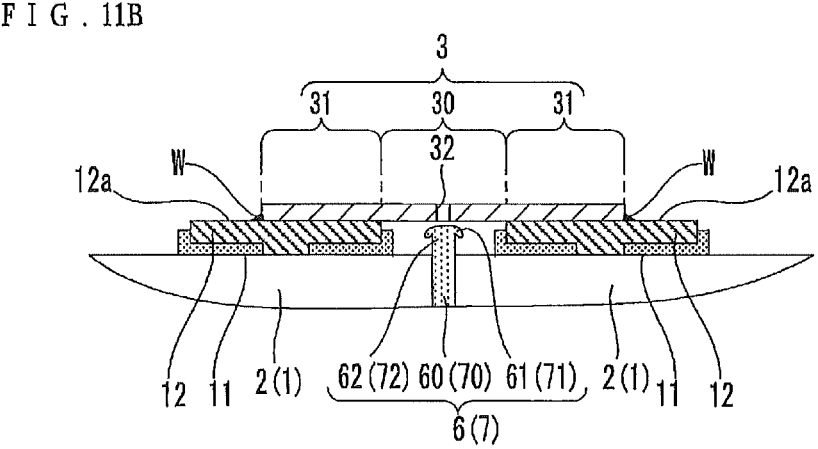

As indicated in FIG. 9, after each first bus bar 2 and each second bus bar 3 are positioned, each first bus bar 2 and each second bus bar 3 are welded (laser welded in this embodiment) onto the upper surface 12a of each corresponding external terminal 12 on which they are mounted (S4). That is, the periphery of each connection region 21 of each first bus bar 2 is welded to the upper surface 12a of each external terminal 12, and the periphery of each connection region 31 of each second bus bar 3 is welded to the upper surface 12a of each external terminal 12 (S4). As a result, as shown in FIG. 10B, a welding line W is formed at the interface between the periphery of the connection region 21 of the first bus bar 2 and the upper surface 12a of the external terminal 12. Thus, the first bus bar 2 is connected to the external terminal 12 both mechanically and electrically. Further, as shown in FIG. 11B, another welding line W is formed at the interface between the periphery of the connection region 31 of the second bus bar 3 and the upper surface 12a of the external terminal 12. Thus, the second bus bar 3 is connected to the external terminal 12 both mechanically and electrically.

When the respective projections 61, 71, and 81 are welded as described above, the projections 61, 71, and 81 inserted into the receiving portions 22 and 32 are melted due to heat of welding (adhered by welding), because of their thermoplasticity, respectively in the first spacer 6, the second spacer 7, and the third spacer 8, so as to be removed from the receiving portions 22 and 32, as shown in FIG. 10B and FIG. 11B. That is, the melting of the projections 61, 71, and 81 causes the projections 61, 71, and 81 to flow out of the receiving portions 22 and 32, and thus the receiving portions 22 and 32 in which the projections 61, 71, and 81 have been inserted turn to be open holes. Accordingly, the insertion of a conductor (fastener) into the receiving portions 22 or 32 is enabled. As described above, the receiving portions 22 and 32 for conductor connection are used also as holes for positioning in the production method according to this embodiment. In other words, the holes for positioning can be utilized also as the receiving portions 22 and 32 for conductor connection.

Figure 10C:
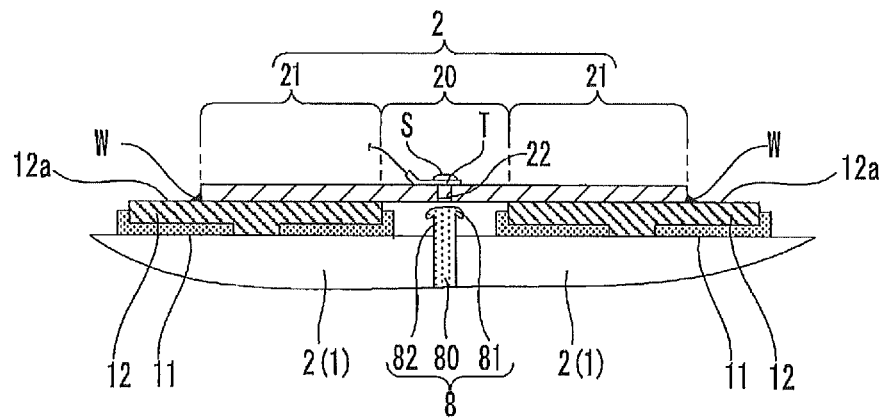
Figure 11C:
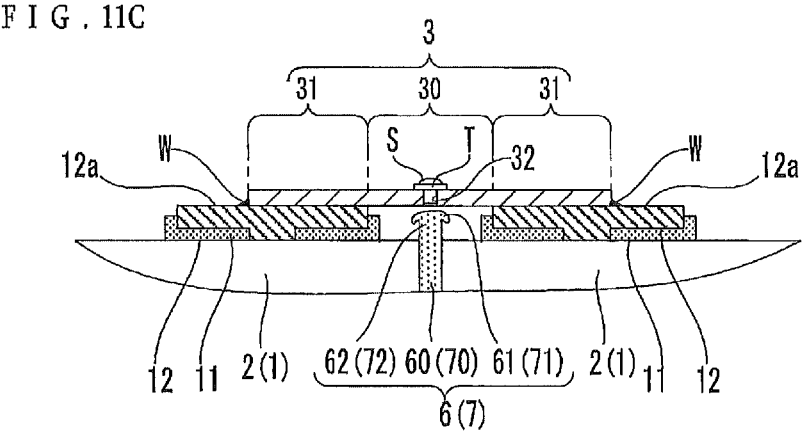

After the receiving portions 22 and 32 have turned to be open holes as mentioned above, a conductor (screw member) for connecting a wiring member is inserted (connected) into each of the receiving portions 22 and 32 of the first bus bar 2 and the second bus bar 3, as indicated in FIG. 9 (S5). That is, a screw member (conductor) S that secures the wiring member T is threaded into each of the receiving portions 22 and 32 that have turned to be open holes, as shown in FIG. 10C and FIG. 11C, thereby securing the wiring member T to each of the first bus bar 2 and the second bus bar 3 in a conductive state.

Then, the plurality of battery cells 1 that have been electrically connected via the bus bars 2 and 3 are housed within the housing 9. Thus, a high-capacity battery (battery module BE) is completed (see FIG. 1 and FIG. 2).

As described above, in this embodiment, each spacer (resin member) 6, 7, or 8 includes the body portion 60, 70, or 80 that is interposed between each two of the battery cells 1, and the projections 61, 71, or 81 that are provided on the body portion 60, 70, or 80 and that can be inserted into the receiving portions 22 or 32 of each bus bar 2 or 3 arranged extending over the external terminals 12 of the two battery cells 1. In the step (S2) of arranging each spacer (resin member) 6, 7, or 8, each spacer (resin member) 6, 7, or 8 is positioned relative to the battery cells 1, thereby allowing the positioning to be performed in the state where the projections 61, 71, or 81 of each spacer (resin member) 6, 7, or 8 are arranged corresponding to the receiving portions 22 or 32 of each corresponding bus bar 2 or 3 arranged on each external terminal 12. That is, the projections 61, 71, or 81 of each spacer (resin member) 6, 7, or 8 are located at positions where the receiving portions 22 or 32 are supposed to be present when each bus bar 2 or 3 is appropriately connected to each corresponding external terminal 12 of the battery cell 1. This allows the projections 61, 71, or 81 of each spacer (resin member) 6, 7, or 8 to be inserted into the receiving portions 22 or 32 of each corresponding bus bar 2 or 3 (the step of arranging each bus bar 2 or 3 on each corresponding external terminal 12 (S3)), so that each bus bar 2 or 3 is positioned with an appropriate arrangement with respect to each corresponding external terminal 12. Accordingly, in the step (S4) of connecting each bus bar 2 or 3 to each corresponding external terminal 12, each bus bar 2 or 3 is connected with an appropriate arrangement with respect to each corresponding external terminal 12.

Further, in the step (S4) of connecting each bus bar 2 or 3 to the external terminal 12, the projections 61, 71, or 81 in the receiving portions 22 or 32 for conductor connection are removed, so that the receiving portions 22 or 32 into which the projections 61, 71, or 81 have been inserted turn to be open holes. As a result, insertion of a conductor S into the receiving portions 22 or 32 is enabled. Accordingly, the receiving portions 22 or 32 for conductor connection can also be used as holes for positioning, which eliminates the need to machine each bus bar 2 or 3 for the positioning of each bus bar 2 or 3.

Particularly in this embodiment: the bus bars 2 and 3 have the receiving portions 22 and 32 that serve as receiving portions for conductor connection; the projections 61, 71, and 81 of the spacers (resin members) 6, 7, and 8 have thermofusibility; and in the step (S4) of connecting each bus bar 2 or 3 to each corresponding external terminal 12, each bus bar 2 or 3 is welded to each corresponding external terminal 12 and the projections 61, 71, or 81 in the receiving portions 22 or 32 are melted due to heat of the welding. Following this, each bus bar 2 or 3 is welded to each corresponding external terminal 12, and the projections 61, 71, or 81 are removed from the receiving portions 22 or 32 for conductor connection. Accordingly, the receiving portions 22 or 32 into which the projections 61, 71, or 81 have been inserted can turn to be open holes, so that insertion of the conductor S into the receiving portions 22 or 32 is enabled without need of another step after the step of connecting each bus bar 2 or 3 to each corresponding external terminal 12.

Further, after the step (S4) of connecting each bus bar 2 or 3 to each corresponding external terminal 12, a step (S5) of inserting the conductor S into the receiving portions 22 or 32 is further provided. Therefore, the conductor S is electrically connected to each bus bar 2 or 3 by the insertion of the conductor S into the receiving portions 22 or 32. Accordingly, various measurement wires or the like can be connected to each bus bar 2 or 3 via the conductor S.

Further, in the step (S1) of arranging the battery cells 1, each two of the battery cells 1 are arranged adjacent to each other, and then in step (S3) of arranging each bus bar 2 or 3, each bus bar 2 or 3 is arranged extending over the each two battery cells 1. Therefore, the projections 61, 71, or 81 of each spacer (resin member) 6, 7, or 8 positioned relative to the battery cells 1 are inserted into the receiving portions 22 or 32, thereby allowing each bus bar 2 or 3 to be positioned with an appropriate arrangement with respect to each corresponding external terminal 12 of the each two battery cells 1 (an arrangement that enables welding to each corresponding external terminal 12 of the each two battery cells 1).

Further, in the step (S2) of arranging each spacer (resin member) 6, 7, or 8, each spacer 6, 7, or 8 as a resin member is positioned by being interposed between each two of the battery cells 1 that are adjacent to each other. In this way, each spacer 6, 7, or 8 is interposed between the each two battery cells 1, thereby allowing each spacer 6, 7, or 8 to be positioned relative to the corresponding battery cells (the two battery cells) 1 that are adjacent to each other. Thus, the positional relationship between each external terminal 12 and the projections 61, 71, or 81 is consistent with the positional relationship between the external terminal 12 and the receiving portions 22 or 32 of each bus bar 2 or 3. Accordingly, each bus bar 2 or 3 is positioned with an appropriate arrangement with respect to each corresponding external terminal 12 of the each two battery cells 1 by inserting the projections 61, 71, or 81 into the receiving portions 22 or 32.

Further, since the body portion 60, 70, or 80 of each spacer 6, 7, or 8 has the vent passages 60a and 60b, 70a and 70b, or 80a and 80b that pass thereacross in a direction intersecting the direction in which the each two battery cells 1 are aligned, the battery cells 1 as a finished product can be cooled by gases passing through the vent passages 60a and 60b, 70a and 70b, and 80a and 80b of the spacers 6, 7, and 8 arranged between the battery cells 1. Thus, the battery module BE serves as a high-capacity battery with stable output.

Figure 12A:
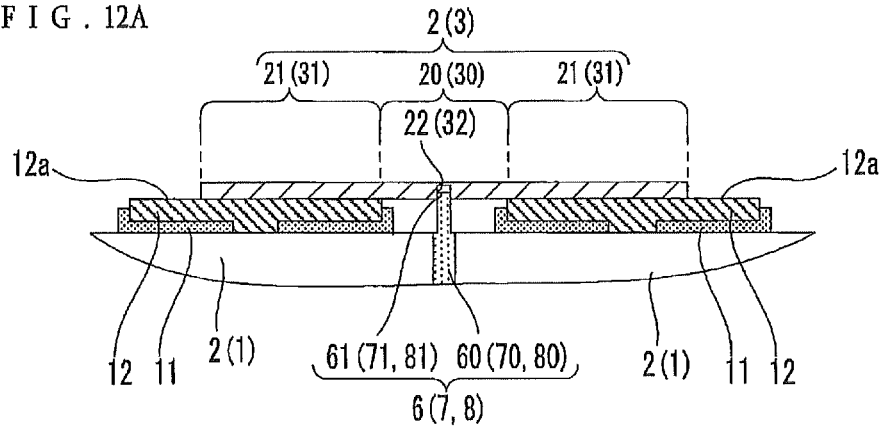
Figure 12B:
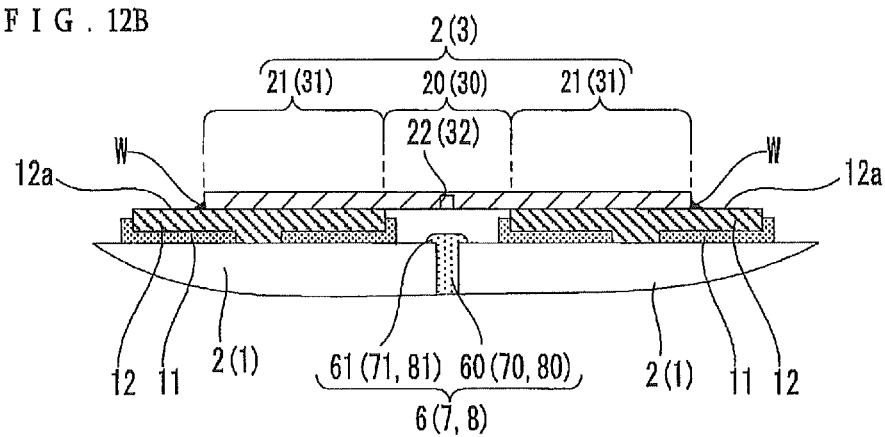
Figure 12C:
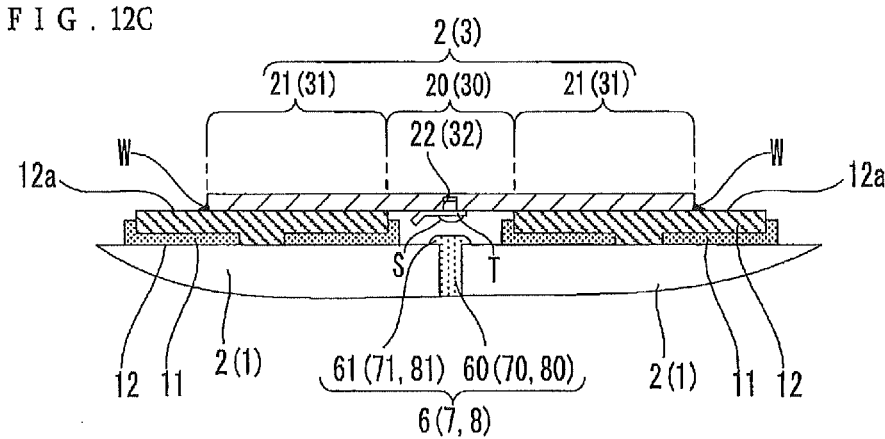

It should be noted that the present invention is not limited to the above-mentioned embodiment and can be variously changed in the range without departing from the scope of the present invention. In the above-mentioned embodiment, the receiving portions 22 or 32 of the bus bar 2 or 3 are formed as through holes, which however is not restrictive. For example, in the case where the conductor S is composed of a screw member such as a screw, the receiving portions 22 or 32 of the bus bar 2 or 3 may be composed of non-through holes (bottomed holes), as shown in FIG. 12. In this case, the bus bar 2 or 3 is arranged with the receiving portions 22 or 32 facing the spacer 6, 7, or 8, as shown in FIG. 12A. Therefore, when the projections 61, 71, or 81 are melted by welding between the bus bar 2 or 3 and the external terminal 12, the receiving portions 22 or 32 only on the side of the spacer 6, 7, or 8 turn to be open holes, as shown in FIG. 12B. Accordingly, as shown in FIG. 12C, the conductor S is inserted into the receiving portions 22 or 32 from the side of the spacers 6, 7, or 8, so that the wiring member T is connected to the bus bar 2 or 3.

In the above-mentioned embodiment, a screw member is described as an example of the conductor S, which however is not restrictive. For example, the conductor S may be a fastening member such as a rivet. It is needless to say that, in such a case, the receiving portions 22 or 32 of each bus bar 2 or 3 are composed of through holes.

In the above-mentioned embodiment, the plurality of battery cells 1 are arranged in rows and columns, which however is not restrictive. For example, the plurality of battery cells 1 may be arranged in one row (or one column). In this case, either the first spacers 6 or the second spacers 7 are employed, and the employed spacers 6 or 7 are arranged while being alternately inverted so that the position of the projections 61 or 71 is alternately changed for each battery cell 1. That is, the spacers 6 or 7 are arranged so that the position of the projections 61 or 71 corresponds to the position of each bus bar 2 or 3 that connects the external terminals 12 to each other. Further, in such a case, projections that have thermofusibility may be provided at two points on the first edge of each spacer. That is, the projections may be provided corresponding respectively to the positions of each external terminal 12 for the positive electrode and each external terminal 12 for the negative electrode of each battery cell 1. In this way, spacers with the same configuration can be arranged between the battery cells 1. Further, when the plurality of battery cells 1 are arranged in rows and columns, the arrangement is not limited to that in two rows and five columns. For example, when a plurality of battery cells 1 are arranged in rows and columns, they may be arranged in two or more rows and five or more columns.

In the above-mentioned embodiment, the first spacers 6, the second spacers 7, and the third spacer 8 that are each independent are provided as resin members, based on the premise that the plurality of battery cells 1 are arranged in rows and columns, which however is not restrictive. For example, in the case where a plurality of battery cells 1 are arranged in rows and columns, the first spacers 6, the second spacers 7, and the third spacer 8 may be integrally molded as one spacer so as to define the regions where the plurality of battery cells 1 are each arranged. In this case, the plurality of battery cells 1 are arranged respectively in the plurality of regions defined by the spacer, thereby allowing the spacer as a resin member to be positioned relative to the battery cells 1. Accordingly, each bus bar 2 or 3 can be appropriately connected with respect to each corresponding external terminal 12, as is the case in the above-mentioned embodiment.

In the above-mentioned embodiment, the plurality of battery cells 1 are provided, which however is not restrictive. At least one battery cell 1 may be provided according to the required output. In this case, the spacers 6, 7, or 8 cannot be arranged. Therefore, thermoplastic projections to be inserted into the receiving portions 22 or 32 of each bus bar 2 or 3 are provided on a resin member that is positioned relative to the battery cells 1, instead of the spacers 6, 7, or 8. This resin member may be formed as a part of the battery cell 1, or may be formed as a separate body from the battery cell 1 and attached to the battery cell 1. Accordingly, though not particularly mentioned in the above-mentioned embodiment, the projections provided on the resin members (the spacers 6, 7, or 8, or the resin members other than the spacers 6, 7, or 8) that are positioned relative to the battery cells 1 are inserted into the receiving portions provided in the third bus bar 4 and the fourth bus bar 5, so that the third bus bar 4 and the fourth bus bar 5 also can be connected while being positioned with an appropriate arrangement with respect to the external terminals 12. However, it is a matter of course that the resin member is positioned relative to the battery cells 1 so that the positional relationship between the external terminal 12 of each battery cell 1 and each corresponding projection is consistent with the positional relationship between the external terminal 12 of each battery cell 1 and the receiving portion 22 or 32 of each corresponding bus bar 2 or 3.

In the above-mentioned embodiment, the bus bars 2, 3, 4, and 5 are all quadrangular (rectangular) in plan view, which however is not restrictive. For example, in each bus bar 2, 3, 4, or 5, the connection regions 21 or 31 and the intermediate regions 20 or 30 may be formed so that the connection regions 21 or 31 are each formed with a smaller or a larger width than that of the intermediate region 20 or 30, instead of forming with the same width. However, it is needless to say that the connection regions 21 or 31 are each formed into a size and shape that fall within the size and shape of the upper surface 12*a* of the external terminal 12 so as to ensure the welding edge.

In the above-mentioned embodiment, each spacer 6, 7, or 8 that is a resin member is entirely composed of a thermoplastic resin, based on the premise that each bus bar 2 or 3 is welded (adhered by welding) to each corresponding external terminal 12, which however is not restrictive. For example, at least the projections 61, 71, and 81 of the resin members 6, 7, and 8 each only need to be composed of a thermoplastic resin. Further, the supporting portions 62, 72, and 82 are provided on the spacers 6, 7, and 8, which however is not restrictive. For example, the projections 61, 71, or 81 may be provided directly on the body portion 60, 70, or 80 and continuously therefrom, as shown in FIG. 12. That is, the supporting portion 62, 72, or 82 may be provided, as needed, for adjusting the projecting amount of the projections 61, 71, or 81 so that the receiving portions 22 or 32 can turn to be open holes when the projections 61, 71, or 81 are melted.

In the above-mentioned embodiment, based on the premise that the conductor S is connected to each of the receiving portions 22 and 32 for conductor connection, the projections 61, 71, and 81 in the receiving portions 22 and 32 are melted by heat generated when the bus bars 2 and 3 are welded to the external terminals 12, so that the projections 61, 71, and 81 in the receiving portions 22 and 32 are removed and the receiving portions 22 and 32 turn to be open holes, which however is not restrictive. For example, after the bus bars 2 and 3 are connected to the external terminals 12, the projections 61, 71, and 81 may be taken out of the receiving portions 22 and 32 by cutting, or the projections 61, 71, and 81 in the receiving portions 22 and 32 may be cut out using a cut tool such as a drill bit, so that the receiving portions 22 and 32 turn to be open holes. Further, the timing at which the projections 61, 71, and 81 are cut or cut out is not limited to a time after the bus bars 2 and 3 are connected to the external terminals 12. That is, when only at least a part of the bus bars 2 and 3 have been connected to the external terminals 12, the arrangement of the bus bars 2 and 3 can be fixed. Accordingly, the projections 61, 71, and 81 may be removed together with the step of connecting the bus bars 2 and 3 to the external terminals 12.

Figure 13:
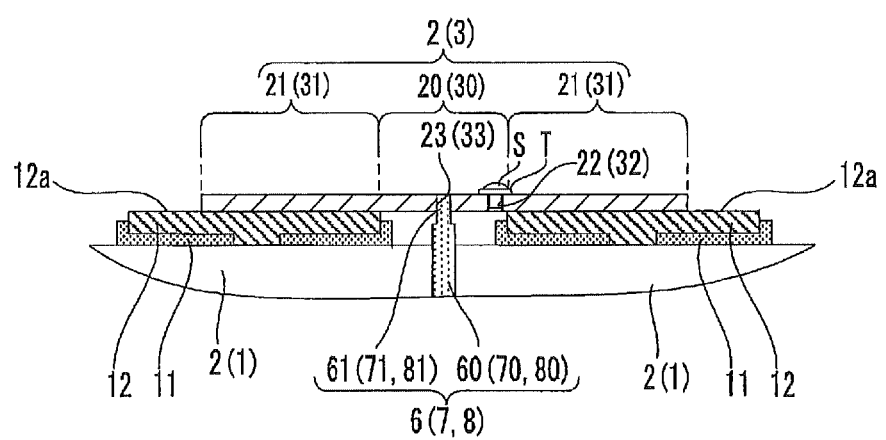
FIG. 13 is an enlarged partial sectional view showing a battery module according to another embodiment of the present invention.

In the above-mentioned embodiment, based on the premise that the projections 61, 71, and 81 of the resin members (spacers) 6, 7, and 8 are inserted into the receiving portions 22 and 32 for conductor connection, the bus bars 2 and 3 are welded to the external terminals 12, so that the projections 61, 71, and 81 are melted due to heat of the welding and the receiving portions 22 and 32 are released, which however is not restrictive. For example, as shown in FIG. 13, another set of receiving portions 23 or 33 that are different from the receiving portions 22 or 32 for conductor connection may be provided in each bus bar 2 or 3. That is, the bus bars 2 and 3 may be connected to the external terminals 12 in the state where the projections 61, 71, and 81 of the resin members (spacers) 6, 7, and 8 are inserted into the another set of the receiving portions 23 and 33 that are different from the receiving portions 22 and 32 for conductor connection, and the projections 61, 71, and 81 may be configured to remain within the receiving portions 23 and 33 in this state. Also in this way, the bus bars 2 and 3 are positioned with an appropriate arrangement by inserting the projections 61, 71, and 81 of the resin member 6, 7, and 8 that have been positioned relative to the electric storage elements 1 into the receiving portions 22 and 32 of the bus bars 2 and 3, as in the above-mentioned embodiment. Accordingly, the bus bars 2 and 3 are appropriately connected to the external terminals 12.

Figure 14:
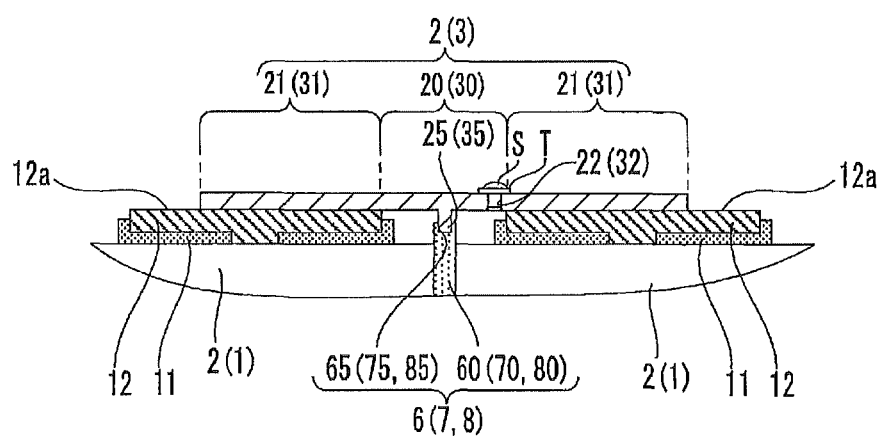
FIG. 14 is an enlarged partial sectional view showing a battery module according to still another embodiment of the present invention.

In the above-mentioned embodiment, as well as the bus bars 2 and 3 have the receiving portions 22 and 32, the resin members (spacers) 6, 7, and 8 have the projections 61, 71, and 81, which however is not restrictive. For example, as shown in FIG. 14, not only the resin member 6, 7, or 8 may have receiving portions 65, 75, or 85, but also each bus bar 2 or 3 may have projections 25 or 35 that can be inserted into the receiving portions 65, 75, or 85 of the resin member 6, 7, or 8. Also in this way, in the step of arranging the resin members 6, 7, and 8, the resin members 6, 7, and 8 are positioned relative to the electric storage elements 1, thereby allowing the positioning to be performed in the state where the receiving portions 65, 75, and 85 of the resin members 6, 7, and 8 are arranged corresponding to the projections 25 and 35 of the bus bars 2 and 3 arranged on the external terminals 12.

That is, the receiving portions 65, 75, and 85 of the resin members 6, 7, and 8 are positioned at positions where the projections 25 and 35 are supposed to be present when the bus bars 2 and 3 are appropriately connected to the external terminals 12 of the electric storage elements (battery cells) 1. In this way, in the step of arranging the bus bars 2 and 3 on the external terminals 12, the bus bars 2 and 3 are positioned with an appropriate arrangement with respect to the external terminals 12 by inserting the projections 25 and 35 into the receiving portions 65, 75, and 85. Accordingly, in the step of connecting the bus bars 2 and 3 to the external terminals 12, the bus bars 2 and 3 are connected with an appropriate arrangement with respect to the external terminals 12.

Figure 15:
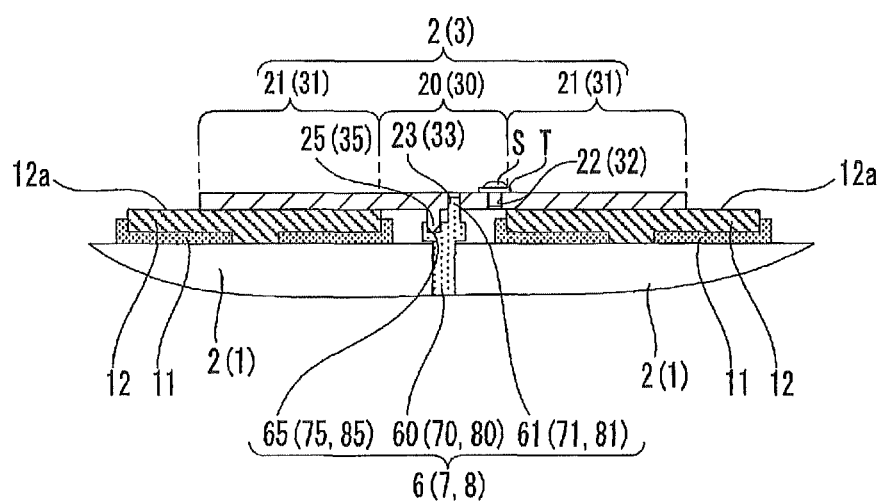
FIG. 15 is an enlarged partial sectional view showing a battery module according to still another embodiment of the present invention.

Further, as shown in FIG. 15, as well as each bus bar 2 or 3 may have the receiving portions 23 or 33 and the projections 25 or 35, each resin member (spacer) 6, 7, or 8 may have the projections 61, 71, or 81 that are inserted into the receiving portions 23 or 33 of each bus bar 2 or 3 and the receiving portions 65, 75, or 85 capable of accommodating the projections 25 or 35 of each bus bar 2 or 3. In this way, in the step of arranging the resin members 6, 7, and 8, the resin members 6, 7, and 8 are positioned relative to the electric storage elements 1, thereby allowing the positioning to be performed in the state where the receiving portions 65, 75, and 85 of the resin members 6, 7, and 8 are arranged corresponding to the projections 25 and 35 of the bus bars 2 and 3 arranged on the external terminals 12, as well as allowing the positioning to be performed in the state where the projections 61, 71, and 81 of the resin members 6, 7, and 8 are arranged corresponding to the receiving portions 23 and 33 of the bus bars 2 and 3 arranged on the external terminals 12.

Accordingly, in the step of arranging the bus bars 2 and 3 on the external terminals 12, the bus bars 2 and 3 are positioned with an appropriate arrangement with respect to the external terminals 12 by inserting the projections 25 and 35 of the bus bars 2 and 3 into the receiving portions 65, 75, and 85 of the resin member 6, 7, and 8, as well as inserting the projections 61, 71, and 81 of the resin members 6, 7, and 8 into the receiving portions 23 and 33 of the bus bars 2 and 3. Accordingly, in the step of connecting the bus bars 2 and 3 to the external terminals 12, the bus bars 2 and 3 are connected with an appropriate arrangement with respect to the external terminals 12.

As described above, not only at least one of the resin member 6, 7, or 8, and the bus bar 2 or 3 has the projections 25, 35, 61, 71, or 81, but also at least the other one of the resin member 6, 7, or 8, or the bus bar 2 or 3 has the receiving portions 23, 33, 65, 75, or 85 capable of accommodating the projections 25, 35, 61, 71, or 81, thereby allowing the bus bar 2 or 3 to be connected with an appropriate arrangement with respect to each external terminal 12 of the electric storage elements (battery cells) 1.

In the above-mentioned embodiment, each external terminal 12 and each bus bar 2 or 3 is composed of an aluminum metal material, which however is not restrictive. For example, each external terminal 12 and each bus bar 2 or 3 may be composed of copper or a metal material such as SUS and steel. That is, each external terminal 12 and each bus bar 2 or 3 only need to be an electrically conductive metal material that can be welded to the other. In the above-mentioned embodiment, each bus bar 2 and each external terminal 12 of each battery cell 1 are welded (adhered by welding) by laser welding, which however is not restrictive. For example, common arc welding or the like may be employed.

Further, each external terminal 12 and each bus bar 2 or 3 is connected by welding in the above-mentioned embodiment, which however is not restrictive. For example, each bus bar 2 may be secured to each corresponding external terminal 12 by screwing. More specifically, each external terminal 12 and each bus bar 2 may be connected to each other with a configuration in which each electric storage element 1 provided with a bolt terminal that serves as each external terminal 12 is employed, and the bolt terminal is screwed into a nut, with the bolt terminal being inserted through each bus bar 2. Further, each external terminal 12 and each bus bar 2 or 3 may be connected to each other with a configuration in which each electric storage element 1 that includes each external terminal 12 provided with a pair of clamping bodies is employed, and each bus bar 2 or 3 is clamped (sandwiched) by the pair of clamping bodies of each external terminal 12. That is, the method for connecting each bus bar 2 or 3 to each corresponding external terminal 12 can be variously changed.

In the above-mentioned embodiment, a lithium-ion secondary battery cell is employed as the electric storage element, which however is not restrictive. As the electric storage element, primary batteries or capacitors such as an electric double-layer capacitor, in addition to various secondary batteries, can be employed.

What is claimed is:

1. A method for producing an electric storage device that includes an electric storage element including an external terminal, and a bus bar to be connected to the external terminal, the method comprising:
    arranging a resin member between two adjacent electric storage elements as a spacer, each of the two adjacent electric storage elements comprising an individual electric storage element, the resin member including a body portion including a first surface and a second surface opposite to the first surface, the first and second surfaces being interposed between the two adjacent electric storage elements and contacting with the two adjacent electric storage elements, respectively;
    arranging the bus bar on the external terminal; and
    connecting the bus bar to the external terminal,
    wherein resin member includes a projection,
    wherein the bus bar includes a receiving portion capable of accommodating the projection,
    wherein, in the arranging the resin member, the resin member is positioned relative to the electric storage element so that a positional relationship between the external terminal and the projection corresponds to a positional relationship between the external terminal and the receiving portion, and
    wherein, in the arranging the bus bar on the external terminal, the projection is inserted into the receiving portion.

2. The method for producing an electric storage device according to claim 1, wherein, in the arranging the bus bar on the external terminal, the bus bar is arranged such that the bus bar extends over external terminals of the two adjacent electric storage elements.

3. The method for producing an electric storage device according to claim 1, wherein the bus bar includes the receiving portion that serves as a conductor connection receiving portion for a conductor connection,
    wherein, in the arranging the bus bar on the external terminal, the projection is inserted into the conductor connection receiving portion, and
    wherein, in the connecting the bus bar to the external terminal or after the connecting the bus bar to the external terminal, the projection in the conductor connection receiving portion is removed.

4. The method for producing an electric storage device according to claim 3, wherein, in the connecting the bus bar to the external terminal, the bus bar is welded to the external terminal, so that the projection in the conductor connection receiving portion is melted due to a heat of welding.

5. The method for producing an electric storage device according to claim 3, further comprising:
inserting a conductor into the conductor connection receiving portion from which the projection has been removed.

6. The method for producing an electric storage device according to claim 1, wherein the spacer is located between case bodies of the two adjacent electric storage elements.

7. The method for producing an electric storage device according to claim 1, wherein the spacer positions the bus bar between the two adjacent electric storage elements.

8. The method for producing an electric storage device according to claim 1, wherein the resin member is capable of positioning the bus bar with respect to the external terminals of the two adjacent electric storage elements.

9. The method for producing an electric storage device according to claim 1, wherein, in the connecting the bus bar to the external terminal, the bus bar is welded to the external terminal.

10. The method for producing an electric storage device according to claim 1, wherein the bus bar includes the receiving portion that serves as a conductor connection receiving portion for a conductor connection, and
wherein, in the connecting the bus bar to the external terminal, the bus bar is welded to the external terminal.

11. The method for producing an electric storage device according to claim 1, wherein the bus bar is welded to the external terminal such that the projection in the conductor connection receiving portion is melted due to a heat of welding.

12. The method for producing an electric storage device according to claim 1, wherein the bus bar includes the receiving portion that serves as a conductor connection receiving portion for a conductor connection,
wherein, in the connecting the bus bar to the external terminal or after the connecting the bus bar to the external terminal, the projection in the conductor connection receiving portion is removed, and
wherein the method further comprises inserting a conductor into the conductor connection receiving portion from which the projection has been removed.

13. The method for producing an electric storage device according to claim 1, wherein, in the connecting the bus bar to the external terminal, the projection is melted due to a heat of a welding.

14. The method for producing an electric storage device according to claim 1, wherein the spacer comprises:
a first spacer located between the two adjacent electric storage elements in a direction of stacking of the two adjacent electric storage elements; and
a second spacer extending along two adjacent electric storage elements perpendicular to the direction of stacking of the two adjacent electric storage elements.

15. The method for producing an electric storage device according to claim 14, wherein the second spacer intersects with the first spacer to space apart the two adjacent electric storage elements.

16. A method for producing an electric storage device that includes an electric storage element including an external terminal, and a bus bar to be connected to the external terminal, the method comprising:
aligning a plurality of the electric storage elements, each of which includes a case body having a bottomed rectangular tube shape and a rectangular cover plate arranged with the external terminal, such that the cover plates of the plurality of electric storage elements face in a same direction;
arranging a resin member between two adjacent electric storage elements as a spacer, each of the two adjacent electric storage elements comprising an individual electric storage element, the resin member including a body portion including a first surface and a second surface opposite to the first surface, the first and second surfaces being interposed between the two adjacent electric storage elements and contacting with the two adjacent electric storage elements, respectively;
arranging the bus bar on the external terminal; and
connecting the bus bar to the external terminal,
wherein the resin member includes a projection,
wherein the bus bar includes a receiving portion capable of accommodating the projection,
wherein, in the arranging the resin member, the resin member is positioned relative to the electric storage element so that a positional relationship between the external terminal and the projection corresponds to a positional relationship between the external terminal and the receiving portion, and
wherein, in the arranging the bus bar on the external terminal, the projection is inserted into the receiving portion.

* * * * *